(12) United States Patent
Zhai et al.

(10) Patent No.: US 10,871,016 B2
(45) Date of Patent: Dec. 22, 2020

(54) PROTECTIVE CASE FOR TABLET COMPUTER AND TWO-IN-ONE COMPUTER

(71) Applicant: Huawei Technologies Co., Ltd., Shenzhen (CN)

(72) Inventors: Xiaodong Zhai, Shenzhen (CN); Pan He, Wuhan (CN); Peng Zhang, Shenzhen (CN); Buwei Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/478,363

(22) PCT Filed: May 23, 2017

(86) PCT No.: PCT/CN2017/085573
§ 371 (c)(1),
(2) Date: Jul. 16, 2019

(87) PCT Pub. No.: WO2018/133273
PCT Pub. Date: Jul. 26, 2018

(65) Prior Publication Data
US 2020/0190877 A1 Jun. 18, 2020

(30) Foreign Application Priority Data
Jan. 17, 2017 (CN) .......................... 2017 1 0034947

(51) Int. Cl.
*E05D 5/14* (2006.01)
*G06F 1/16* (2006.01)
*E05D 5/10* (2006.01)

(52) U.S. Cl.
CPC .............. *E05D 5/14* (2013.01); *G06F 1/1628* (2013.01); *G06F 1/1632* (2013.01);
(Continued)

(58) Field of Classification Search
CPC ..................................................... G06F 1/1681
See application file for complete search history.

(56) References Cited

U.S. PATENT DOCUMENTS 4,630,333 A * 12/1986 Vickers ................. E05D 11/082
16/338
5,491,874 A * 2/1996 Lowry .................. G06F 1/1616
16/337
(Continued)

FOREIGN PATENT DOCUMENTS

| CN | 201335093 Y | 10/2009 |
| CN | 102341023 A | 2/2012 |

(Continued)

OTHER PUBLICATIONS

Machine Translation and Abstract of Chinese Publication No. CN204117023, Jan. 21, 2015, 13 pages.
(Continued)

*Primary Examiner* — Jerry Wu
(74) *Attorney, Agent, or Firm* — Conley Rose, P.C.

(57) ABSTRACT

A protective case for a tablet computer includes a first support plate, a second support plate, and a cover plate that are located in a same horizontal plane and that are sequentially arranged in a first direction, where the first support plate is hinged to the second support plate by using a damping rotating shaft, the second support plate is rotatably connected to the cover plate, a bottom support is disposed on an edge of one end that is close to the cover plate and that is of an upper surface of the second support plate, the first support plate and the second support plate are configured to support and protect a rear surface of a tablet computer, the bottom support is configured to be detachably connected to a side wall of the tablet computer.

20 Claims, 14 Drawing Sheets

(52) U.S. Cl.
CPC .......... *G06F 1/1669* (2013.01); *G06F 1/1681* (2013.01); *E05D 2005/106* (2013.01); *E05D 2005/145* (2013.01); *E05Y 2900/606* (2013.01)

(56) References Cited

U.S. PATENT DOCUMENTS

| | | | |
|---|---|---|---|
| 9,329,639 B2* | 5/2016 | Lee | ........................ G06F 1/1669 |
| 2010/0139042 A1 | 6/2010 | Chang | |
| 2012/0069503 A1 | 3/2012 | Lauder et al. | |
| 2012/0090932 A1 | 4/2012 | Liu | |
| 2013/0111705 A1 | 5/2013 | Mai et al. | |
| 2013/0201625 A1 | 8/2013 | Liang et al. | |
| 2014/0218854 A1 | 8/2014 | Onda | |
| 2016/0123059 A1 | 5/2016 | Liu | |

FOREIGN PATENT DOCUMENTS

| | | | |
|---|---|---|---|
| CN | 103246321 | A | 8/2013 |
| CN | 203658907 | U | 6/2014 |
| CN | 103970207 | A | 8/2014 |
| CN | 204117023 | U | 1/2015 |
| CN | 104482035 | A | 4/2015 |
| CN | 204288059 | U | 4/2015 |
| CN | 104714596 | A | 6/2015 |
| CN | 205841479 | U | 12/2016 |
| JP | 2009257421 | A | 11/2009 |
| JP | 2012529720 | A | 11/2012 |
| WO | 2015179257 | A1 | 11/2015 |

OTHER PUBLICATIONS

Machine Translation and Abstract of Chinese Publication No. CN205841479, Dec. 28, 2016, 9 pages.
Foreign Communication From A Counterpart Application, Chinese Application No. 201780010074.5, Chinese Office Action dated Dec. 23, 2019, 10 pages.
Foreign Communication From A Counterpart Application, European Application No. 17893014.5, Extended European Search Report dated Jan. 7, 2020, 11 pages.
Machine Translation and Abstract of Chinese Publication No. CN104714596, Jun. 17, 2015, 18 pages.
Machine Translation and Abstract of Chinese Publication No. CN203658907, Jun. 18, 2014, 10 pages.
Machine Translation and Abstract of Chinese Publication No. CN204288059, Apr. 22, 2015, 6 pages.
Foreign Communication From A Counterpart Application, PCT Application No. PCT/CN2017/085573, English Translation of International Search Report dated Aug. 15, 2017, 2 pages.
Foreign Communication From A Counterpart Application, PCT Application No. PCT/CN2017/085573, English Translation of Written Opinion dated Aug. 15, 2017, 4 pages.

* cited by examiner

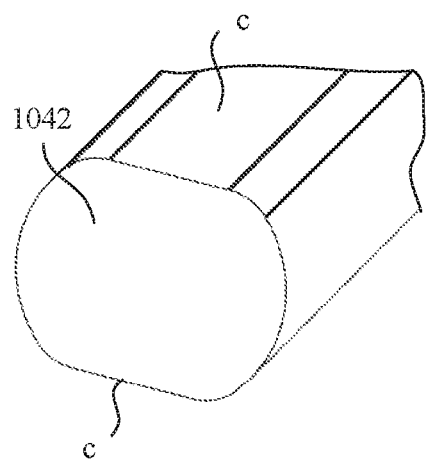
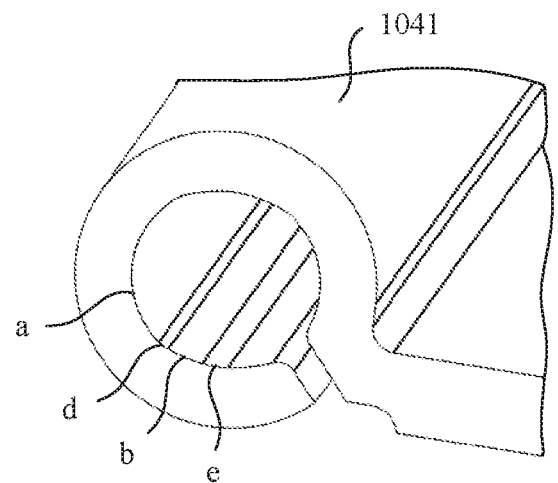
FIG. 15(a)　　　　　　　　FIG. 15(b)
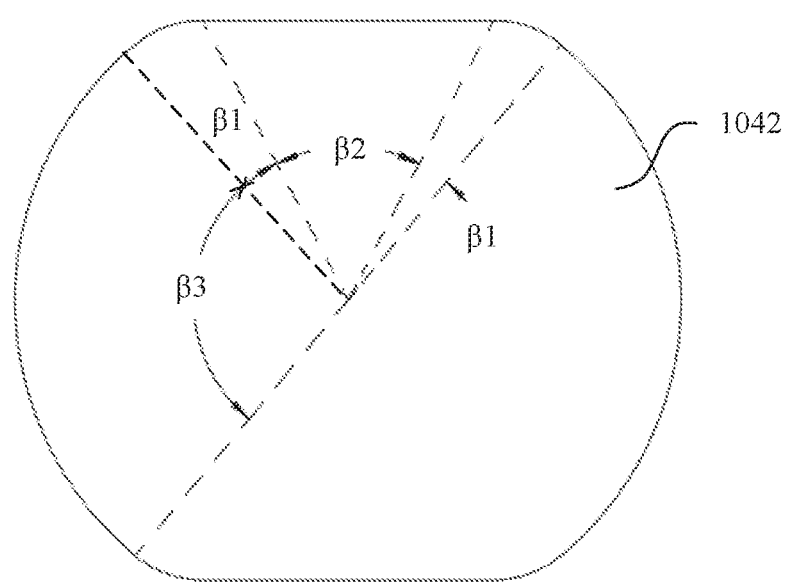
FIG. 16

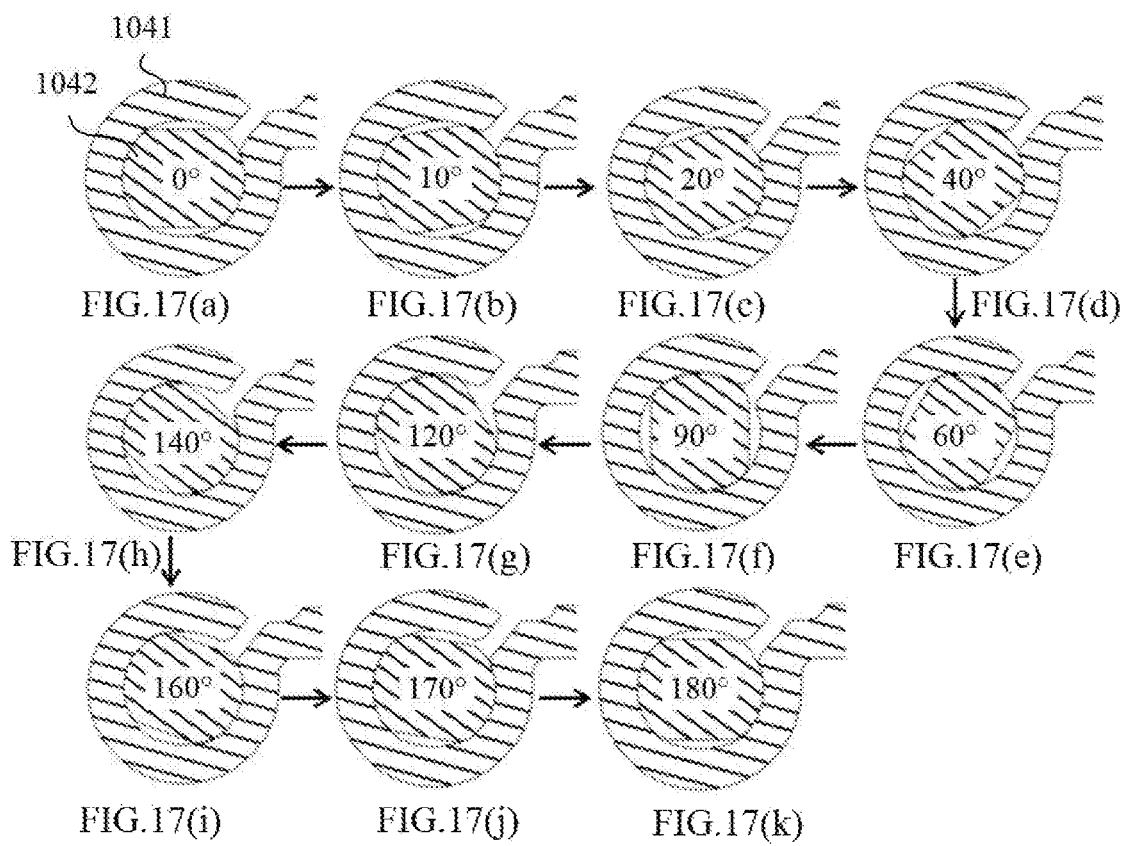
FIG.17(a) FIG.17(b) FIG.17(c) FIG.17(d)
FIG.17(h) FIG.17(g) FIG.17(f) FIG.17(e)
FIG.17(i) FIG.17(j) FIG.17(k)
FIG. 18

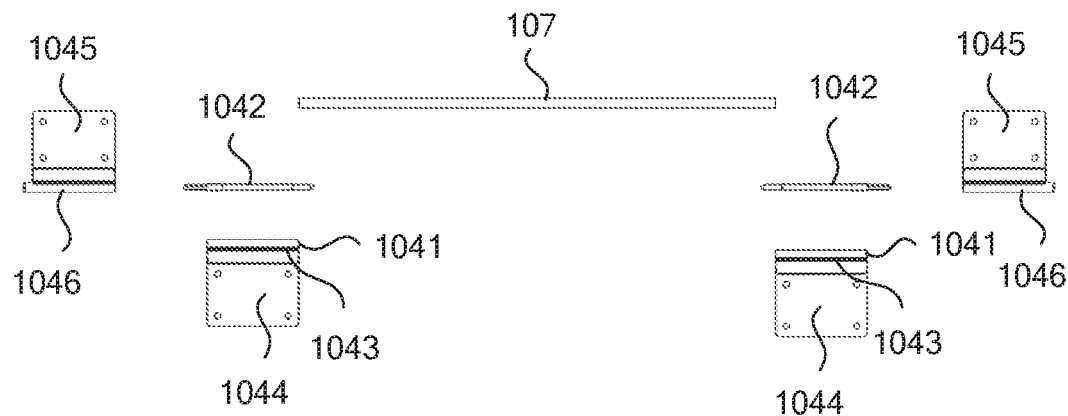
FIG. 19
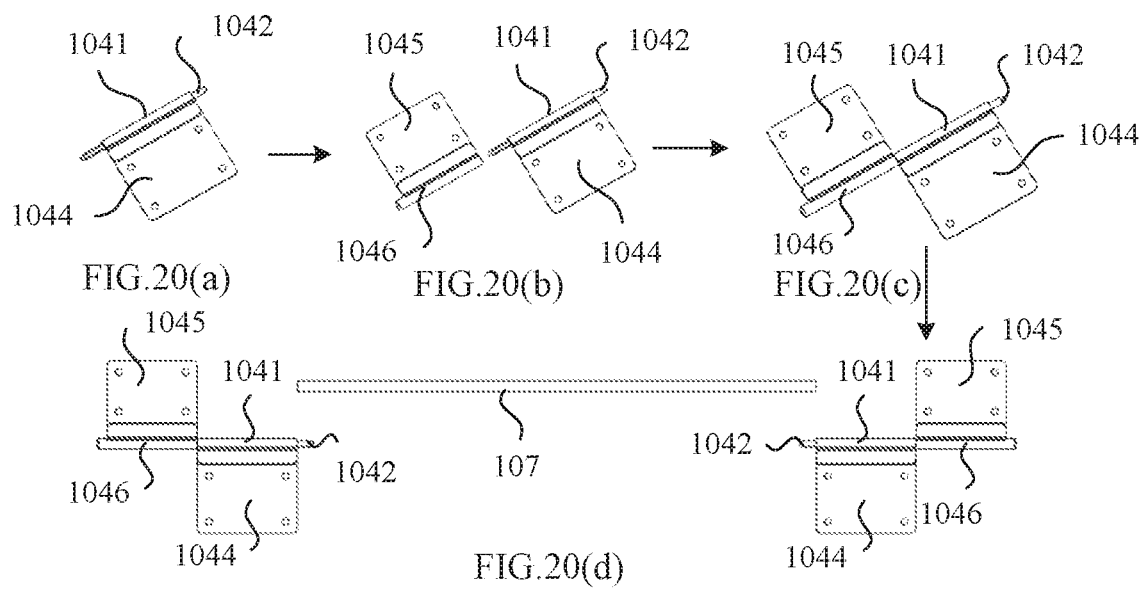
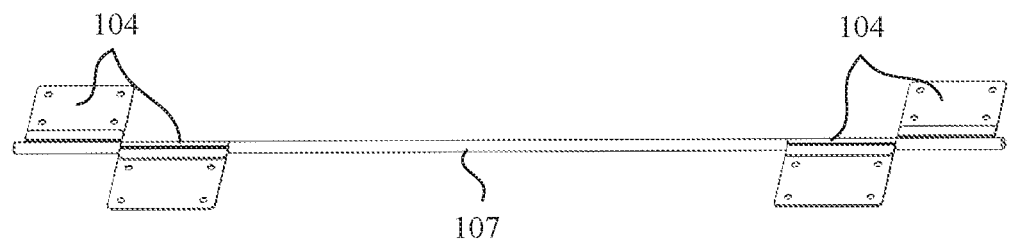
FIG. 21

US 10,871,016 B2

PROTECTIVE CASE FOR TABLET COMPUTER AND TWO-IN-ONE COMPUTER

CROSS-REFERENCE TO RELATED APPLICATIONS

This application is a U.S. National Stage of International Patent Application No. PCT/CN2017/085573 filed on May 23, 2017, which claims priority to Chinese Patent Application No. 201710034947.8 filed on Jan. 17, 2017. The disclosures of the aforementioned applications are hereby incorporated by reference in their entireties.

TECHNICAL FIELD

This application relates to the field of electronic product technologies, and in particular, to a protective case for a tablet computer and a two-in-one computer.

BACKGROUND

As consumption demands change, consumers expect to obtain better mobile experience of lightness, thinness, and portability, and support of great productivity and personalized functions. During selection among numerous personal computer (Personal Computer, PC) products, two-in-one computers with features of lightness, thinness, portability, and a proper configuration are becoming a new trend in a personal computer market. Currently, the two-in-one computers in the market roughly include the following categories:

In a first category, a pluggable two-in-one computer is included. For example, FIG. 1 shows a pluggable two-in-one computer in the prior art. Referring to FIG. 1, the pluggable two-in-one computer includes a tablet host 011 and a keyboard 012. An edge of one end of the keyboard 012 is hinged to a connecting piece 014 by using a damping rotating shaft 013. A clamping hook 015 is disposed on the connecting piece 014. A groove (not shown in the figure) capable of cooperating with the clamping hook 015 is disposed on the tablet host 011. When the clamping hook 015 is cooperatively hooked to the groove, the keyboard 012 and the tablet host 011 are integrated, and the two-in-one computer is in a notebook computer mode in this case. When the groove is released from the clamping hook 015, the two-in-one computer may switch to a tablet computer mode. However, when the two-in-one computer shown in FIG. 1 is in the notebook computer mode, a fulcrum on the tablet host 011 is relatively low, a center of gravity is relatively high, and a screen wobbles when being tapped. Therefore, stability of supporting the tablet host 011 by the keyboard 012 is relatively poor, and user experience is relatively poor.

In a second category, a flip two-in-one computer is included. For example, FIG. 2 shows a flip two-in-one computer in the prior art. Referring to FIG. 2, the flip two-in-one computer includes a display screen 021 and a keyboard 022. The display screen 021 is hinged to the keyboard 022 by using a damping rotating shaft 023. The damping rotating shaft 023 may enable the display screen 021 to rotate by 0° to 360° relative to the keyboard 022. Therefore, as shown in FIG. 2, when the display screen 021 is in a standing state relative to the keyboard 022, the two-in-one computer is in a notebook computer mode. As shown in FIG. 3, when the display screen 021 is flipped by 360° and is folded to the keyboard 022 in half, the two-in-one computer may switch to a tablet computer mode. However, the keyboard 022 cannot be separated from the display screen 021, and in the tablet computer mode, the keyboard 022 and the display screen 021 needs to be used by folding the two-in-one computer in half. Therefore, use portability and experience of lightness and thinness in the tablet computer mode are undesirable.

In a third category, a slider two-in-one computer is included. For example, FIG. 4 shows a slider two-in-one computer in the prior art. Referring to FIG. 4, the slider two-in-one computer includes a display screen 031 and a keyboard 032 installed on a rear surface of the display screen 031. Slides 033 are designed on the rear surface of the display screen 031 (as shown in FIG. 6). The display screen may be first horizontally pushed backwards by using the slides 033 (as shown in FIG. 5), is then uplifted to form a proper angle (as shown in FIG. 6), and is effectively supported by using a damping rotating shaft, so that the two-in-one computer switches from a tablet computer mode to a notebook computer mode. In other words, when the display screen 031 is pushed, as shown in FIG. 6, the two-in-one computer is in the notebook computer mode. When the display screen horizontally overlaps the keyboard, as shown in FIG. 4, the two-in-one computer switches to the tablet computer mode. However, the slides need to be installed in relatively large structural space, and an entire machine is not light or thin enough. Moreover, the keyboard cannot be separated from the display screen, and in the tablet computer mode, the keyboard and the display screen need to be used after the display screen horizontally overlaps the keyboard. Therefore, use portability and experience of lightness and thinness in the tablet computer mode are undesirable.

In a fourth category, a supporting-type two-in-one computer is included. For example, FIG. 7 and FIG. 8 show a supporting-type two-in-one computer in the prior art. Referring to FIG. 7 and FIG. 8, the supporting-type two-in-one computer includes a keyboard 042, a tablet host 041, and a support 043. The tablet host 041 is attracted to or separated from the keyboard 042 by using a magnetic stripe, so that the two-in-one computer freely switches between a notebook computer mode and a tablet computer mode. The support 043 is built on an outer surface of the tablet host 041, and is hinged to the tablet host 041 by using a damping rotating shaft. The tablet host 041 can be effectively supported by rotating the support 043. However, because the support 043 is built in the tablet host 041, the tablet host 041 requires relatively large structural space, and experience of lightness and thinness in the tablet computer mode is undesirable. In addition, this design damages cleanness and uniformity of a rear surface of the tablet host 041, and affects good appearance of the tablet host. Moreover, the rear surface of the tablet host 041 is directly exposed, and a protection structure is required to effectively protect the rear surface.

In conclusion, the current two-in-one computers in the market have the following disadvantages: 1. In the notebook computer mode, the support point on the tablet host is relatively low, the center of gravity is relatively high, and supporting stability is relatively poor. 2. Use portability and a degree of experience of lightness and thinness in the tablet computer mode are relatively low. 3. An external cleanness degree is relatively low, and the two-in-one computer is not aesthetic. 4. The tablet host is not protected.

SUMMARY

Embodiments of this application provide a protective case for a tablet computer and a two-in-one computer, so that a tablet computer can be stably supported in a notebook computer mode, use portability and a degree of experience of lightness and thinness in a tablet computer mode can be improved, and external cleanness and uniformity of a two-in-one computer can be also improved.

To achieve the foregoing objectives, the following technical solutions are used in the embodiments of this application.

According to a first aspect, this application provides a protective case for a tablet computer, including a first support plate, a second support plate, and a cover plate that are located in a same horizontal plane and that are sequentially arranged in a first direction, where the first support plate is hinged to the second support plate by using a damping rotating shaft, the second support plate is rotatably connected to the cover plate, a bottom support is disposed on an edge of one end that is close to the cover plate and that is of an upper surface of the second support plate, the first support plate and the second support plate are configured to support and protect a rear surface of a tablet computer, the bottom support is configured to be detachably connected to a side wall of the tablet computer, a keyboard is installed on the cover plate, and the cover plate can be configured to protect a front surface of the tablet computer after rotating and overlapping the first support plate and the second support plate.

For the protective case that is for a tablet computer and that is provided in this embodiment of this application, after the tablet computer with the front surface facing upwards and the rear surface facing downwards is placed on the first support plate and the second support plate, and is connected to the bottom support, the cover plate may be flipped upwards by 180° to cover the front surface of the tablet computer, so as to effectively protect the front surface and the rear surface of the tablet computer. When the tablet computer switches to a notebook computer mode, the cover plate may be placed on a horizontal desktop, the second support plate is flipped upwards by a first angle relative to the cover plate, the first support plate is flipped downwards by a second angle relative to the second support plate, and an edge of an end that is of the first support plate and that is far away from the second support plate comes into contact with the horizontal desktop, so as to form an A-frame to support the rear surface of the tablet computer. In addition, the bottom support supports a lower end of the tablet computer. Compared with the prior art, in this application, in the notebook computer mode, the bottom support is connected to the rear surface of the tablet computer, and the rear surface of the tablet computer is supported by using the A-frame. Compared with a prior-art solution in which only the lower end of the tablet computer is supported, this application has higher stability. To switch to a tablet computer mode, the tablet computer only needs to be taken out of the protective case. Compared with the prior art, in this application, in the tablet computer mode, use portability and a degree of experience of lightness and thinness of the tablet computer is relatively desirable. Moreover, in this application, the tablet computer is supported by using the protective case. Therefore, no support needs to be additionally disposed on the rear surface of the tablet computer, and external cleanness and uniformity in the tablet computer mode are relatively high.

With reference to the first aspect, in a first optional implementation of the first aspect, the damping rotating shaft includes a shaft sleeve and a shaft core, one of the shaft sleeve and the shaft core is relatively secured to the first support plate, the other one of the shaft sleeve and the shaft core is relatively secured to the second support plate, the shaft sleeve is made of an elastic material, a base circle arc section and a changeable-diameter arc section are formed around an inner wall of the shaft sleeve, the shaft core is cooperatively sleeved in the base circle arc section, a radius of the changeable-diameter arc section is less than a radius of the base circle arc section, and a flat position is formed at a position that is on an outer circular surface of the shaft core and that fits the changeable-diameter arc section. In this way, when the shaft core is sleeved in the shaft sleeve and rotates relative to the shaft sleeve, the outer circular surface of the shaft core comes into contact with and presses the changeable-diameter arc section of the inner wall of the shaft sleeve, so that the shaft sleeve extends outwards in a radial direction and generates elastic contraction force, so as to grip the shaft core and exert rotation damping force on the shaft core. Therefore, a damping effect is achieved. The damping rotating shaft in the structure may achieve a damping effect depending only on a structure design of the shaft core and the shaft sleeve, without a need to additionally dispose a damping structure. Therefore, the structure is simple, and a size is relatively small, facilitating implementation of design of a light and thin protective case.

With reference to the first optional implementation of the first aspect, in a second optional implementation of the first aspect, there are two changeable-diameter arc sections, the two changeable-diameter arc sections are symmetrically disposed by using a central axis of the shaft sleeve as a symmetry axis, two flat positions are formed on the outer circular surface of the shaft core, and the two flat positions are in a one-to-one correspondence with the two changeable-diameter arc sections. In this way, a position of the central axis of the shaft core can be prevented, by using the two symmetrically disposed changeable-diameter arc sections, from shifting after the shaft core rotates in the shaft sleeve. Moreover, the two symmetrically disposed changeable-diameter arc sections can increase intensity of interference of the shaft core to the inner wall of the shaft sleeve when the shaft core rotates in the shaft sleeve, and increase damping force generated when the shaft core rotates in the shaft sleeve, so that the protective case can stably support the tablet computer at a large angle in the notebook computer mode.

With reference to the first or second optional implementation of the first aspect, in a third optional implementation of the first aspect, an arc-shaped chamfer is disposed in a corner between each of flat position surfaces of the flat positions and the outer circular surface of the shaft core. In this way, the shaft core can continuously rotate in the shaft sleeve, so that the A-frame can steplessly adjust a support angle.

With reference to the first or second optional implementation of the first aspect, in a fourth optional implementation of the first aspect, an elastic notch is opened on a side wall of the shaft sleeve, the elastic notch communicates with a shaft hole in the shaft sleeve, and the elastic notch extends through two end surfaces of the shaft sleeve. In this way, elasticity of the shaft sleeve can be improved by using the elastic notch. This reduces abrasion between the shaft core and the shaft sleeve.

With reference to the first optional implementation of the first aspect, in a fifth optional implementation of the first aspect, there are a plurality of damping rotating shafts, the plurality of damping rotating shafts are evenly disposed on an edge of one end at which the first support plate is connected to the second support plate, and rotation axes of the plurality of damping rotating shafts are collinear. In this way, stability of a connection between the first support plate and the second support plate is ensured by using the plurality of damping rotating shafts, the damping rotating shaft may be manufactured with a relatively small length, and coaxiality of shaft cores in the damping rotating shafts during machining is easily ensured. Therefore, machining difficulty of the shaft cores is relatively low, and assembling difficulty of the damping rotating shafts is relatively low.

With reference to the first optional implementation of the first aspect, in a sixth optional implementation of the first aspect, there are two damping rotating shafts, the two damping rotating shafts are symmetrically disposed at two ends of an edge on which the first support plate is connected to the second support plate, and rotation axes of the two damping rotating shafts are collinear. In this way, stability of a connection between the first support plate and the second support plate is ensured by using the two damping rotating shafts, the damping rotating shaft may be manufactured with a relatively small length, and coaxiality of shaft cores in the damping rotating shafts during machining is easily ensured. Therefore, machining difficulty of the shaft cores is relatively low, and assembling difficulty of the damping rotating shafts is relatively low.

With reference to the fifth or sixth optional implementation of the first aspect, in a seventh optional implementation of the first aspect, a blocking shaft is disposed between two adjacent damping rotating shafts, the blocking shaft is configured to block a gap between the first support plate and the second support plate, and two ends of the blocking shaft are connected to shaft cores in the two adjacent damping rotating shafts. In this way, the gap between the first support plate and the second support plate is blocked by using the blocking shaft. This ensures good appearance of the protective case. The blocking shaft may be securely or rotatably connected to the shaft cores. This is not specifically limited herein.

With reference to the seventh optional implementation of the first aspect, in an eighth optional implementation of the first aspect, connection holes are opened on end surfaces of the two ends of the blocking shaft, and one end that is of each of the shaft cores in the two adjacent damping rotating shafts and that is close to the blocking shaft extends outwards and fits into the connection hole. In this way, when the blocking shaft is connected to the shaft cores, the shaft cores need to be sleeved only in the connection holes without a complex connection operation. Therefore, an installation process and a detachment process are simple, and efficiency is relatively high.

With reference to the first aspect, in a ninth optional implementation of the first aspect, a width of the first support plate is equal to a width of the second support plate in the first direction. In this way, the A-frame formed by the first support plate and the second support plate can have a relatively large adjustment range of the support angle, and a floor area obtained after the A-frame is formed by the first support plate and the second support plate can also be narrowed down.

With reference to the first optional implementation of the first aspect, in a tenth optional implementation of the first aspect, a helical lube oil groove is opened around a side wall of the shaft core, and the lube oil groove extends from one end of the shaft core to the other end of the shaft core. When the helical lube oil groove plays a role of oil storage and lubrication, a scrap generated due to friction between the shaft core and the shaft sleeve can be expelled along the lube oil groove, so as to avoid a lubrication failure caused by blocking the lube oil groove by the scrap, so that a life of the damping rotating shaft is prolonged.

With reference to the first optional implementation of the first aspect, in an eleventh optional implementation of the first aspect, both the shaft core and the shaft sleeve are made of high-carbon steel. The high-carbon steel has relatively high hardness and relatively desirable abrasion resistance. This can prolong the life of the damping rotating shaft.

With reference to the first optional implementation of the first aspect, in a twelfth optional implementation of the first aspect, the shaft core is machined and molded by a computer numerical control machine machining center. The computer numerical control machine machining center has relatively high molding precision. This can ensure size precision of the shaft core.

With reference to the first optional implementation of the first aspect, in a thirteenth optional implementation of the first aspect, the shaft sleeve is integrally molded through metal injection molding. The metal injection molding has relatively high molding precision. This can ensure size precision of the shaft sleeve.

According to a second aspect, this application provides a two-in-one computer, including a tablet computer, a keyboard, and a protective case, where the protective case is the protective case for a tablet computer in any one of the foregoing technical solutions, a rear surface of the tablet computer is supported on a first support plate and a second support plate of the protective case, a side wall of the tablet computer is detachably connected to a bottom support of the protective case, and the keyboard is installed on a cover plate of the protective case.

For the two-in-one computer provided in this embodiment of this application, the cover plate of the protective case is flipped to cover a front surface of the tablet computer, so as to effectively protect the front surface and the rear surface of the tablet computer. When the tablet computer switches to a notebook computer mode, the cover plate may be placed on a horizontal desktop, the second support plate is flipped upwards by a first angle relative to the cover plate, the first support plate is flipped downwards by a second angle relative to the second support plate, and an edge of an end that is of the first support plate and that is far away from the second support plate comes into contact with the horizontal desktop, so as to form an A-frame to support the rear surface of the tablet computer. In addition, the bottom support supports a lower end of the tablet computer. Compared with the prior art, in this application, in the notebook computer mode, the bottom support is connected to the rear surface of the tablet computer, and the rear surface of the tablet computer is supported by using the A-frame. Compared with a prior-art solution in which only the lower end of the tablet computer is supported, this application has higher stability. To switch to a tablet computer mode, the tablet computer only needs to be taken out of the protective case. Compared with the prior art, in this application, in the tablet computer mode, use portability and a degree of experience of lightness and thinness of the tablet computer is relatively desirable. Moreover, in this application, the tablet computer is supported by using the protective case. Therefore, no support needs to be additionally disposed on the rear surface of the tablet computer, and external cleanness and uniformity in the tablet computer mode are relatively high.

With reference to the second aspect, in a first optional implementation of the second aspect, the side wall of the tablet computer is made of a magnetic material, a magnet is secured in the bottom support, and the side wall of the tablet computer is attracted on the bottom support. In this way, a detachable connection between the bottom support and the tablet computer is implemented. The detachable connection manner is available provided that the magnetic material is selected as a material of the side wall of the tablet computer, without a need to dispose a connection structure on the side wall of the tablet computer. Therefore, required structural space is small, facilitating reduction in a volume of the tablet computer. In addition, the connection structure does not need to be disposed on the side wall of the tablet computer. This ensures external cleanness of the tablet computer.

BRIEF DESCRIPTION OF DRAWINGS

The following briefly describes the accompanying drawings required for describing the embodiments or the prior art.

FIG. 15 (a) is a schematic structural diagram of a shaft core in a protective case for a tablet computer according to an embodiment of this application;

FIG. 15 (b) is a schematic structural diagram of a shaft sleeve in a protective case for a tablet computer according to an embodiment of this application;

FIG. 16 is a schematic diagram of a cross sectional shape of a shaft core in a protective case for a tablet computer according to an embodiment of this application;

FIG. 17 (a) is a schematic structural diagram in which a shaft core rotates by 0° relative to a shaft sleeve in a protective case for a tablet computer according to an embodiment of this application;

FIG. 17 (b) is a schematic structural diagram in which a shaft core rotates by 10° relative to a shaft sleeve in a protective case for a tablet computer according to an embodiment of this application;

FIG. 17 (c) is a schematic structural diagram in which a shaft core rotates by 20° relative to a shaft sleeve in a protective case for a tablet computer according to an embodiment of this application;

FIG. 17 (d) is a schematic structural diagram in which a shaft core rotates by 40° relative to a shaft sleeve in a protective case for a tablet computer according to an embodiment of this application;

FIG. 17 (e) is a schematic structural diagram in which a shaft core rotates by 60° relative to a shaft sleeve in a protective case for a tablet computer according to an embodiment of this application;

FIG. 17 (f) is a schematic structural diagram in which a shaft core rotates by 90° relative to a shaft sleeve in a protective case for a tablet computer according to an embodiment of this application;

FIG. 17 (g) is a schematic structural diagram in which a shaft core rotates by 120° relative to a shaft sleeve in a protective case for a tablet computer according to an embodiment of this application;

FIG. 17 (h) is a schematic structural diagram in which a shaft core rotates by 140° relative to a shaft sleeve in a protective case for a tablet computer according to an embodiment of this application;

FIG. 17 (i) is a schematic structural diagram in which a shaft core rotates by 160° relative to a shaft sleeve in a protective case for a tablet computer according to an embodiment of this application;

FIG. 17 (j) is a schematic structural diagram in which a shaft core rotates by 170° relative to a shaft sleeve in a protective case for a tablet computer according to an embodiment of this application;

FIG. 17 (k) is a schematic structural diagram in which a shaft core rotates by 180° relative to a shaft sleeve in a protective case for a tablet computer according to an embodiment of this application;

FIG. 18 is a line graph of a relationship between friction torque of a damping rotating shaft and an angle $\alpha$ by which a shaft core rotates relative to a shaft sleeve in a protective case for a tablet computer according to an embodiment of this application;

FIG. 19 is a schematic diagram of a combined structure of a damping rotating shaft and a blocking shaft in a protective case for a tablet computer according to an embodiment of this application;

FIG. 20 (a) is a schematic diagram of an assembly structure of a first connecting plate, a shaft core, and a shaft sleeve of a damping rotating shaft in a protective case for a tablet computer according to an embodiment of this application;

FIG. 20 (b) is a schematic structural diagram of a first connecting plate, a shaft core, a shaft sleeve, a second connecting plate, and a connecting shaft sleeve of a damping rotating shaft in a protective case for a tablet computer according to an embodiment of this application;

FIG. 20 (c) is a schematic structural diagram after a first connecting plate, a shaft core, a shaft sleeve, a second connecting plate, and a connecting shaft sleeve of a damping rotating shaft in a protective case for a tablet computer are assembled according to an embodiment of this application;

FIG. 20 (d) is a schematic structural diagram of a damping rotating shaft and a blocking shaft in a protective case for a tablet computer according to an embodiment of this application;

FIG. 21 is a schematic structural diagram after a damping rotating shaft and a blocking shaft in a protective case for a tablet computer are assembled according to an embodiment of this application;

FIG. 22 (b) is a schematic structural diagram after the component that is obtained after the damping rotating shaft and the blocking shaft that are shown in FIG. 22 (a) are assembled and the first support plate are assembled;

FIG. 22 (c) is a schematic structural diagram of a second support plate and a component that is obtained after the damping rotating shaft, the blocking shaft, and the first support plate that are shown in FIG. 22 (b) are assembled;

FIG. 22 (d) is a schematic structural diagram after the component that is obtained after the damping rotating shaft, the blocking shaft, and the first support plate that are shown in FIG 22 (c) are assembled and the second support plate are assembled;

DESCRIPTION OF EMBODIMENTS

The following describes the technical solutions in the embodiments of this application with reference to the accompanying drawings in the embodiments of this application.

In the descriptions of this application, directions or position relationships indicated by the terms "center", "up", "down", "front", "rear", "left", "right", "vertical", "horizontal", "top", "bottom", "inside", "outside", and the like are based on the directions or position relationships shown in the accompanying drawings, and are merely intended to describe this application and simplify the descriptions, but are not intended to indicate or imply that an apparatus or an element shall have a specific direction or be formed and operated in a specific direction, and therefore shall not be understood as a limitation on this application.

In the descriptions of this application, it should be noted that, unless otherwise specified and limited explicitly, the terms "installation" and "connection" shall be understood in a general manner, for example, may be a fixed connection, a detachable connection, an abut connection, or an integrated connection. Persons of ordinary skill in the art may understand specific meanings of the terms in this application according to specific situations.

Figure 1:
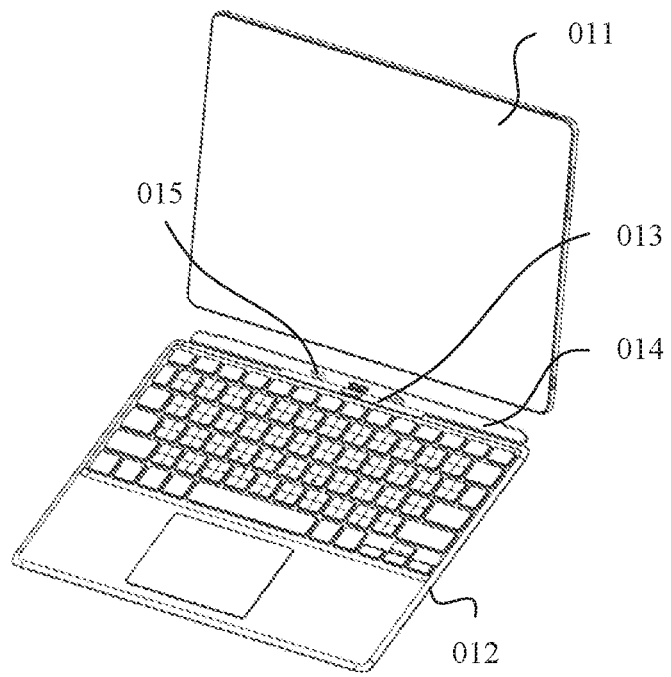
FIG. 1 is a schematic structural diagram of a first two-in-one computer in the prior art.
Figure 2:
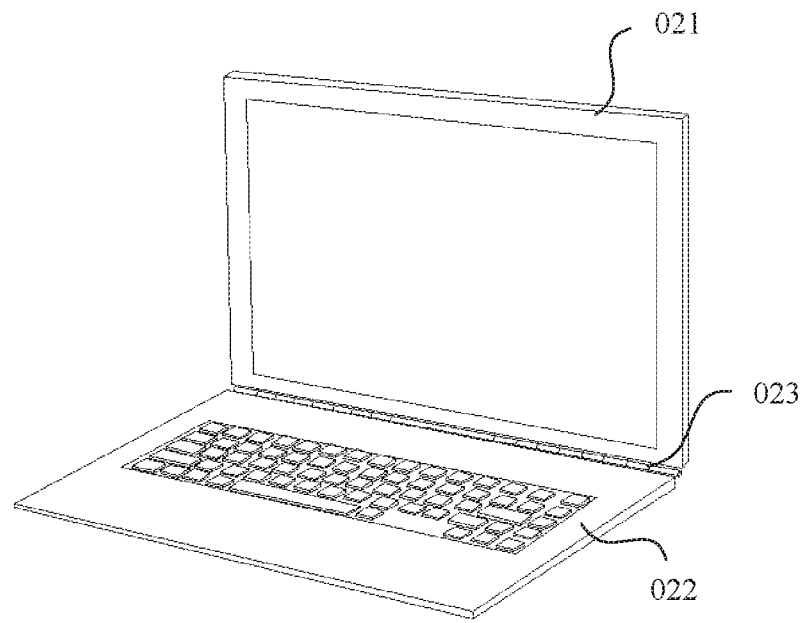
FIG. 2 is a schematic structural diagram of a second two-in-one computer in a notebook computer mode in the prior art.
Figure 3:
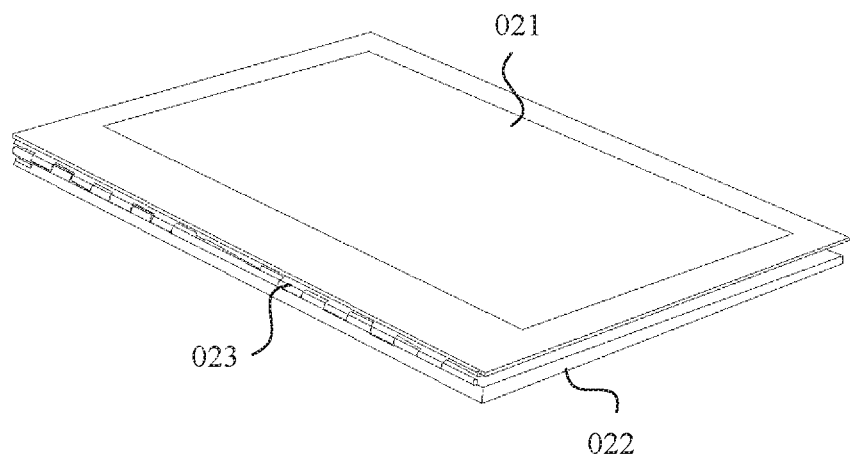
FIG. 3 is a schematic structural diagram of the two-in-one computer shown in FIG. 2 in a tablet computer mode.
Figure 4:
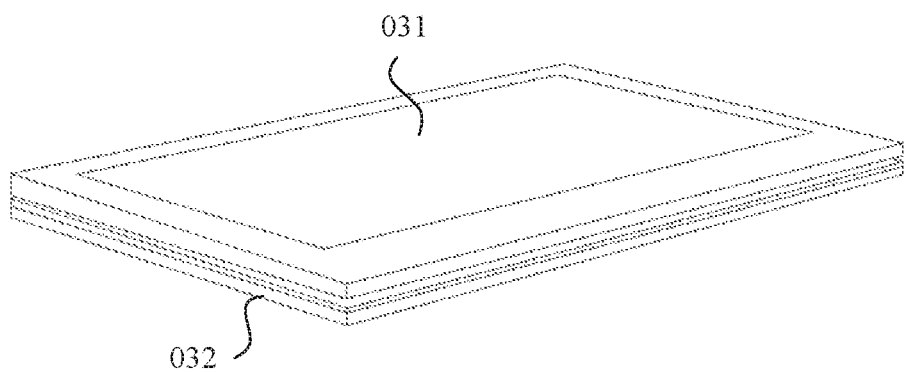
FIG. 4 is a schematic structural diagram of a third two-in-one computer in a tablet computer mode in the prior art.
Figure 5:
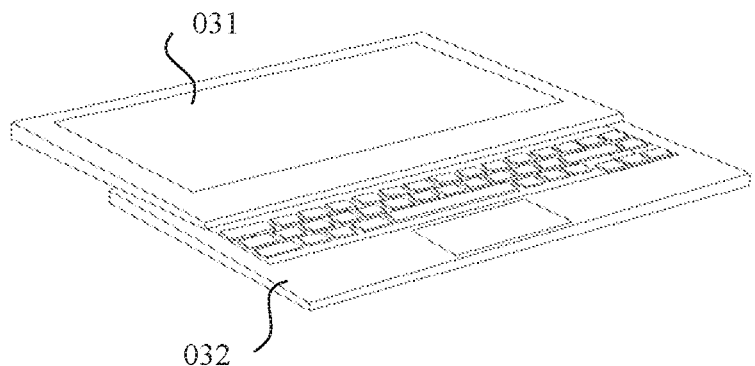
FIG. 5 is a schematic structural diagram of the two-in-one computer shown in FIG. 4 when a display screen is pushed.
Figure 6:
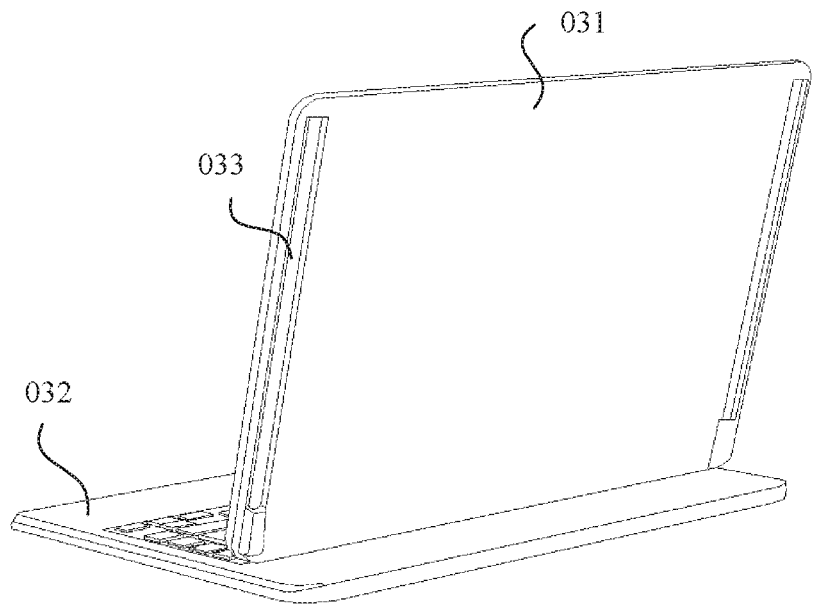
FIG. 6 is a schematic structural diagram of the two-in-one computer shown in FIG. 4 in a notebook computer mode.
Figure 7:
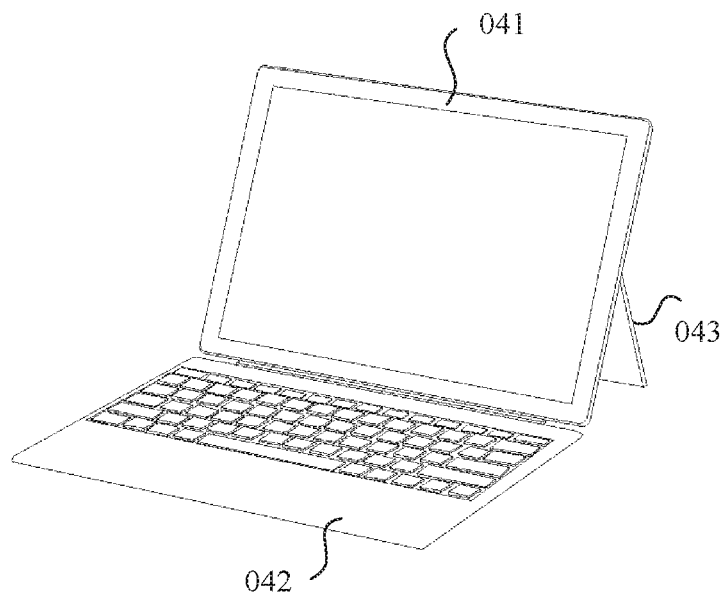
FIG. 7 is a schematic structural diagram of a fourth two-in-one computer in the prior art.
Figure 8:
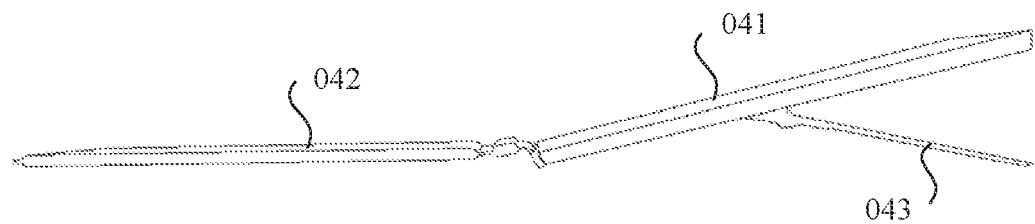
FIG. 8 is a schematic structural diagram of a side face of the two-in-one computer shown in FIG. 7.
Figure 9:
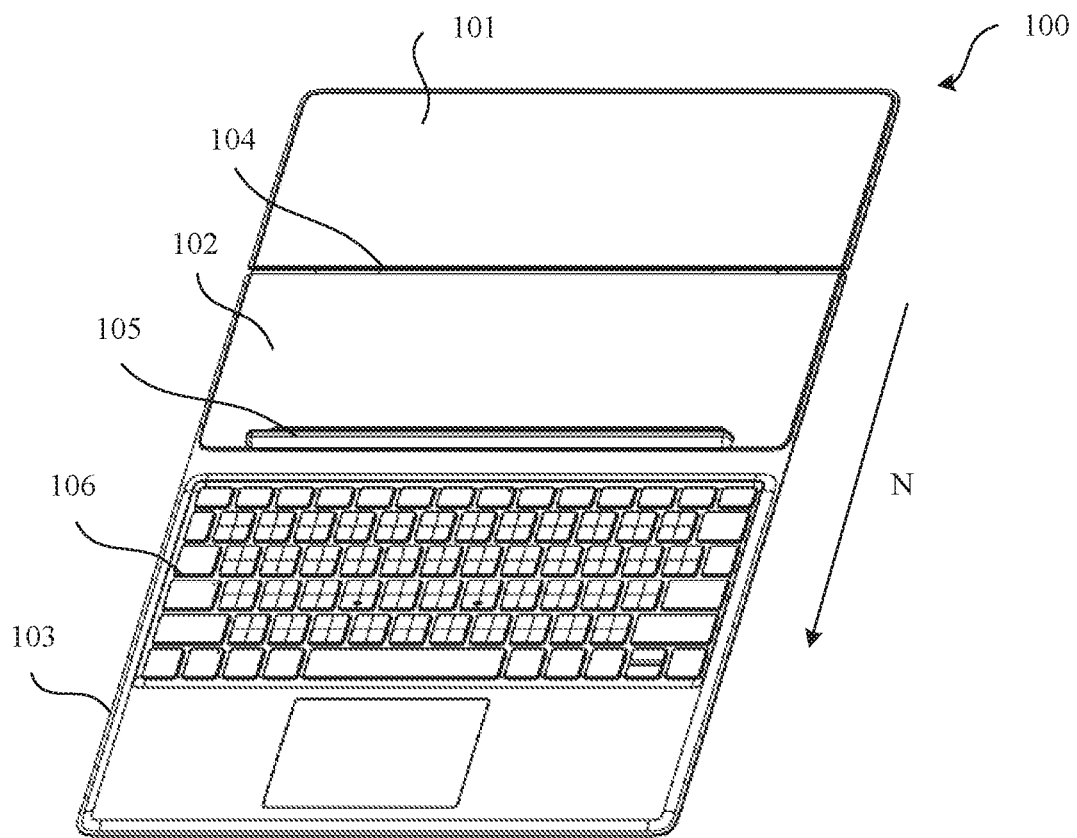
FIG. 9 is a schematic structural diagram of a protective case for a tablet computer according to an embodiment of this application.
Figure 10:
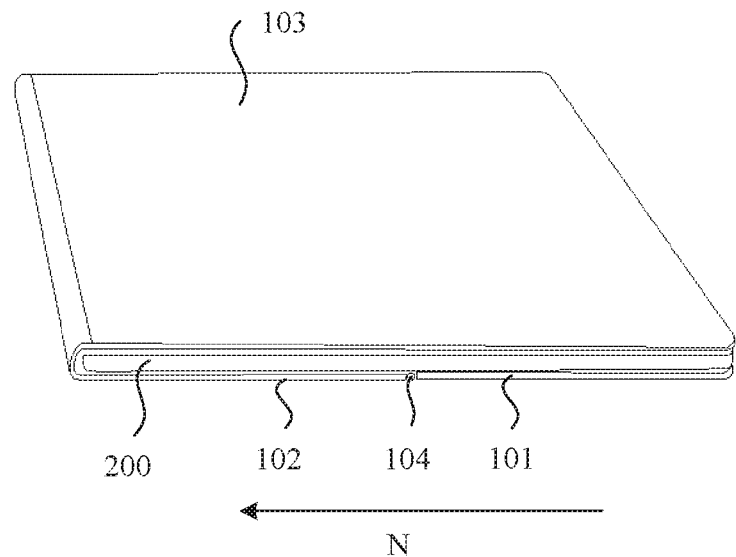
FIG. 10 is a schematic structural diagram in which a protective case for a tablet computer protects a tablet computer according to an embodiment of this application.

An embodiment of this application provides a protective case 100 for a tablet computer. Referring to FIG. 9, the protective case 100 for a tablet computer includes a first support plate 101, a second support plate 102, and a cover plate 103 that are located in a same horizontal plane and that are sequentially arranged in a first direction N. The first support plate 101 is hinged to the second support plate 102 by using a damping rotating shaft 104, the second support plate 102 is rotatably connected to the cover plate 103, a bottom support 105 is disposed on an edge of one end that is close to the cover plate 103 and that is of an upper surface of the second support plate 102, the first support plate 101 and the second support plate 102 are configured to support and protect a rear surface of a tablet computer, the bottom support 105 is configured to be detachably connected to a side wall of the tablet computer, a keyboard 106 is installed on the cover plate 103, and the cover plate 103 can be configured to protect a front surface of the tablet computer 200 after rotating and overlapping the first support plate 101 and the second support plate 102 (as shown in FIG. 10).

Figure 11:
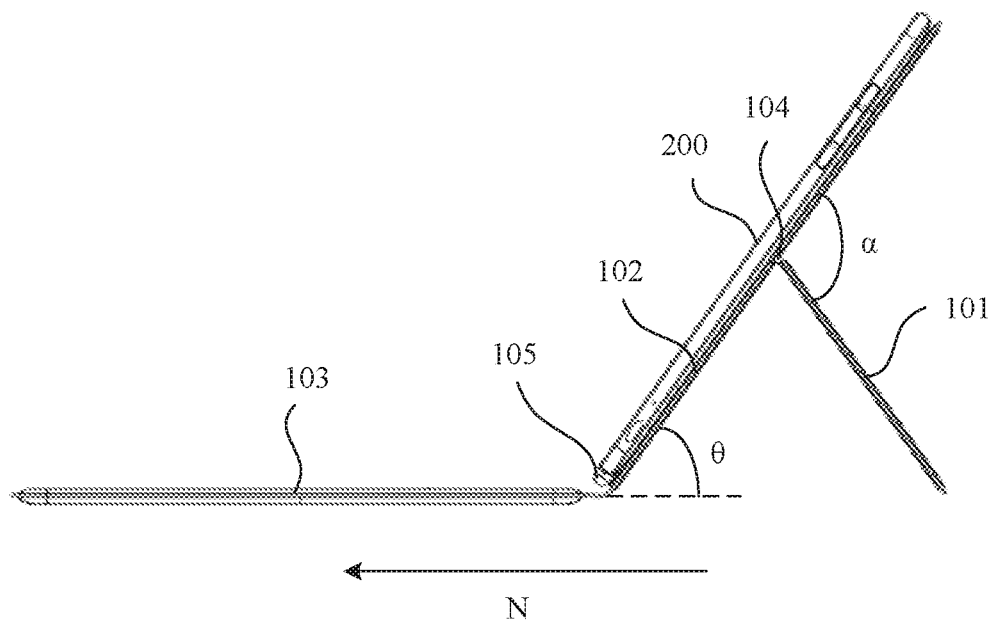
FIG. 11 is a first schematic structural diagram in which a protective case for a tablet computer is configured to support a tablet computer according to an embodiment of this application.
Figure 12:
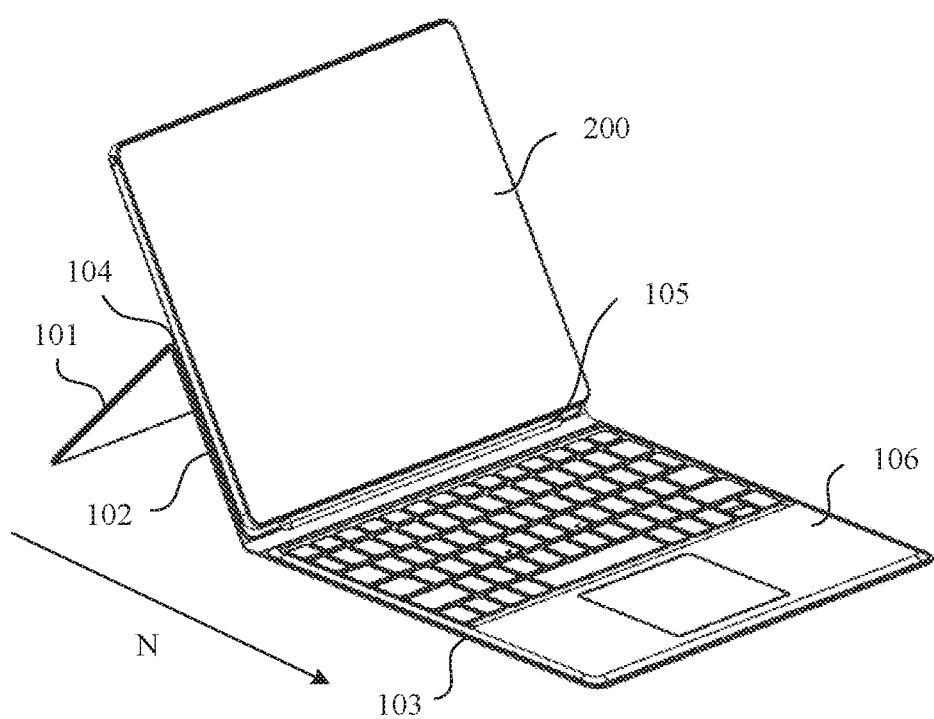
FIG. 12 is a second schematic structural diagram in which a protective case for a tablet computer is configured to support a tablet computer according to an embodiment of this application.

For the protective case 100 that is for a tablet computer and that is provided in this embodiment of this application, after the tablet computer 200 with the front surface facing upwards and the rear surface facing downwards is placed on the first support plate 101 and the second support plate 102, and is connected to the bottom support 105, the cover plate 103 may be flipped upwards by 180° to cover the front surface of the tablet computer 200, so as to effectively protect the front surface and the rear surface of the tablet computer 200. A state after the cover plate 103 is flipped is shown in FIG. 10. When the tablet computer 200 switches to a notebook computer mode, as shown in FIG. 11, the cover plate 103 may be placed on a horizontal desktop (not shown in the figure), the second support plate 102 is flipped upwards by a first angle θ relative to the cover plate 103, the first support plate 101 is flipped downwards by a second angle α relative to the second support plate 102, and an edge of an end that is of the first support plate 101 and that is far away from the second support plate 102 comes into contact with the horizontal desktop, so as to form an A-frame to support the rear surface of the tablet computer 200. In addition, the bottom support 105 supports a lower end of the tablet computer 200, as shown in FIG. 12. Compared with the prior art, in this application, in the notebook computer mode, as shown in FIG. 12, the bottom support 105 is connected to the lower end of the tablet computer 200, and the rear surface of the tablet computer 200 is supported by using the A-frame. Compared with a prior-art solution in which only the lower end of the tablet computer 200 is supported, this application has higher stability. To switch to a tablet computer mode, the tablet computer 200 only needs to be taken out of the protective case 100. Compared with the prior art, in this application, in the tablet computer mode, use portability and a degree of experience of lightness and thinness of the tablet computer 200 is relatively desirable. Moreover, in this application, the tablet computer 200 is supported by using the protective case 100. Therefore, no support needs to be additionally disposed on the rear surface of the tablet computer 200, and external cleanness and uniformity in the tablet computer mode are relatively high.

In the foregoing embodiment, as shown in FIG. 11, the first angle θ is a support angle of the A-frame. To adapt to the notebook computer mode, optionally, a value range of the first angle θ is 20° to 70°, and a value range of the second angle α is 40° to 140°.

In the embodiment shown in FIG. 9, to implement a rotatable connection between the second support plate 102 and the cover plate 103, a rotating shaft may be connected between the second support plate 102 and the cover plate 103, or the second support plate 102 and the cover plate 103 may be covered with a soft material. The rotatable connection between the second support plate 102 and the cover plate 103 is implemented by using a fold of the soft material. This is not specifically limited herein. When the rotatable connection between the second support plate 102 and the cover plate 103 is implemented by using the fold of the soft material covering the second support plate 102 and the cover plate 103, the soft material may be leather or cloth. This is not specifically limited herein.

In the embodiment shown in FIG. 9, a specific structure of the damping rotating shaft 104 may include the following two optional implementations:

In a first optional implementation, the damping rotating shaft includes a shaft sleeve, an elastic material, and a shaft core, the elastic material is attached around an inner wall of the shaft sleeve, and the shaft core is tightly pressed against the elastic material and is cooperatively sleeved in the shaft sleeve. In the structure of the damping rotating shaft, the elastic material exerts grip force on the shaft core due to deformation, to prevent the shaft core from rotating in the shaft sleeve. Therefore, a damping effect is achieved. The structure is simple and is easy to implement.

Figure 13:
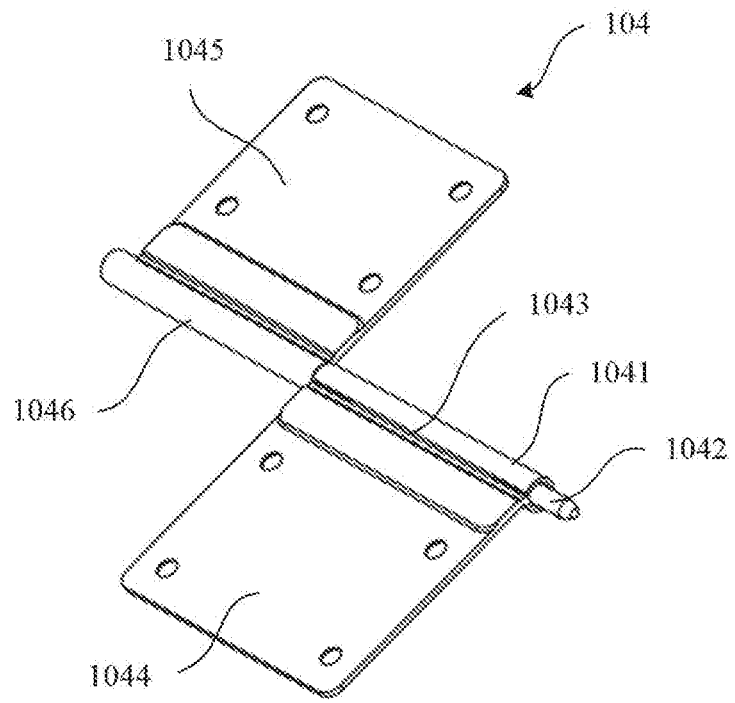
FIG. 13 is a schematic structural diagram of a damping rotating shaft in a protective case for a tablet computer according to an embodiment of this application.
Figure 14:
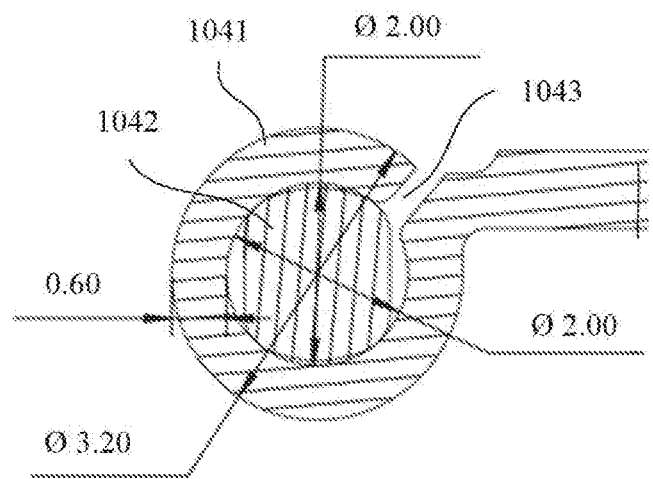
FIG. 14 is a schematic structural diagram of cooperation between a shaft sleeve and a shaft core in a protective case for a tablet computer according to an embodiment of this application.

In a second optional implementation, referring to FIG. 13, the damping rotating shaft 104 includes a shaft sleeve 1041 and a shaft core 1042, one of the shaft sleeve 1041 and the shaft core 1042 is relatively secured to the first support plate 101, the other one of the shaft sleeve 1041 and the shaft core 1042 is relatively secured to the second support plate 102, and the shaft sleeve 1041 is made of an elastic material. Moreover, as shown in FIG. 15 (*b*), a base circle arc section a and a changeable-diameter arc section b are formed around an inner wall of the shaft sleeve 1041, the shaft core 1042 is cooperatively sleeved in the base circle arc section a, and a radius of the changeable-diameter arc section b is less than a radius of the base circle arc section a. As shown in FIG. 15 (*a*), a flat position c is formed at a position that is on an outer circular surface of the shaft core 1042 and that fits the changeable-diameter arc section b. In this way, when the shaft core 1042 is sleeved in the shaft sleeve 1041 (as shown in FIG. 14) and rotates relative to the shaft sleeve 1041, the outer circular surface of the shaft core 1042 comes into contact with and presses the changeable-diameter arc section b of the inner wall of the shaft sleeve 1041, so that the shaft sleeve 1041 extends outwards in a radial direction and generates elastic contraction force, so as to grip the shaft core 1042 and exert rotation damping force on the shaft core 1042. Therefore, the damping effect is achieved. The damping rotating shaft 104 in the structure may achieve a damping effect depending only on a structure design of the shaft core 1042 and the shaft sleeve 1041, without a need to additionally dispose another structure. Therefore, the structure is simple, and a size is relatively small, facilitating implementation of design of a light and thin protective case 100.

In the foregoing embodiment, it should be noted that the radius of the base circle arc section a is a distance between a point on the base circle arc section a and a central axis of the shaft sleeve 1041. For example, when a radius of the shaft core is 0.95 mm, the radius of the base circle arc section a may be 0.96 mm, so that the shaft core can fit the base circle arc section. The radius of the changeable-diameter arc section b is a distance between a point on the changeable-diameter arc section b and the central axis of the shaft sleeve 1041. For example, the radius of the changeable-diameter arc section b may be 0.82 mm, and in this case, the shaft core fits the changeable-diameter arc section b to generate friction torque of 6 kgf.cm.

A quantity of changeable-diameter arc sections b may be one, two, three, or the like. This is not specifically limited herein. Correspondingly, a quantity of flat positions c on the shaft core 1042 may be one, two, three, or the like. This is not specifically limited herein. However, to prevent a position of a central axis of the shaft core 1042 from shifting after the shaft core 1042 rotates in the shaft sleeve 1041, and to increase damping force generated when the shaft core 1042 rotates in the shaft sleeve 1041, optionally, there are two changeable-diameter arc sections b, and the two changeable-diameter arc sections b are symmetrically disposed by using the central axis of the shaft sleeve 1041 as a symmetry axis. As shown in FIG. 15 (*a*), two flat positions c are formed on the outer circular surface of the shaft core 1042, and the two flat positions c are in a one-to-one correspondence with the two changeable-diameter arc sections b. In this way, the position of the central axis of the shaft core 1042 can be prevented, by using the two symmetrically disposed changeable-diameter arc sections b, from shifting after the shaft core 1042 rotates in the shaft sleeve 1041. Moreover, the two symmetrically disposed changeable-diameter arc sections b can increase intensity of interference of the shaft core 1042 to the inner wall of the shaft sleeve 1041 when the shaft core 1042 rotates in the shaft sleeve 1041 relative to the shaft sleeve 1041, and increase damping force generated when the shaft core 1042 rotates in the shaft sleeve 1041, so that the protective case 100 can stably support the tablet computer 200 at a large angle in the notebook computer mode. In addition, a specified quantity of changeable-diameter arc sections b is relatively small, and the shaft sleeve 1041 has relatively low structure complexity.

In addition, to enable the A-frame formed by the first support plate 101 and the second support plate 102 to steplessly adjust the support angle, optionally, an upward slope arc section d and a downward slope arc section e are respectively disposed at two ends of the changeable-diameter arc section b in circumference of an inner hole of the shaft sleeve 1041, a radius of the upward slope arc section d gradually decreases from the radius of the base circle arc section a to the radius of the changeable-diameter arc section b, and a radius of the downward slope arc section e gradually increases from the radius of the changeable-diameter arc section b to the radius of the base circle arc section a. Therefore, continuity of a change in the intensity of the interference generated when the shaft core 1042 rotates in the shaft sleeve 1041 is improved by using the upward slope arc section d and the downward slope arc section e, so that the A-frame formed by the first support plate 101 and the second support plate 102 supports bidirectional stepless adjustment of the support angle (θ in FIG. 11). To enable the A-frame formed by the first support plate 101 and the second support plate 102 to unidirectionally steplessly adjust the support angle, the upward slope arc section d needs to be disposed at only one end of the changeable-diameter arc section b in the circumference of the inner hole of the shaft sleeve 1041. Moreover, during actual machining, to reduce molding difficulty of the shaft sleeve, the radius of the upward slope arc section d and the radius of the downward slope arc section e may be set to fixed values, and the radius of the upward slope arc section d and the radius of the downward slope arc section e are between the radius of the base circle arc section a and the radius of the changeable-diameter arc section b. Therefore, stepless adjustment of the support angle is implemented to some extent, structure complexity of the shaft sleeve is reduced, and molding difficulty of the shaft sleeve is reduced.

To further enable the A-frame formed by the first support plate 101 and the second support plate 102 to steplessly adjust the support angle, as shown in FIG. 15 (*a*) and FIG. 16, optionally, an arc-shaped chamfer is disposed in a corner between each of flat position surfaces of the flat positions c and the outer circular surface of the shaft core 1042. In this way, the shaft core 1042 can continuously rotate in the shaft sleeve 1041, so that the A-frame can steplessly adjust the support angle θ.

As shown in FIG. 16, a central angle of an arc surface of the arc-shaped chamfer relative to the central axis of the shaft core is $β1$, and $β1$ may be 5°, 8°, 10°, or the like. This is not specifically limited herein.

Based on the foregoing descriptions, schematic structural diagrams when the shaft core shown in FIG. 15 (*a*) or FIG. 16 rotates in the shaft sleeve shown in FIG. 15 (*b*) by 0° to 180° may be FIG. 17 (*a*) to FIG. 17 (*k*), and a line of a relationship between friction torque of the damping rotating shaft and an angle α by which the shaft core rotates relative to the shaft sleeve is shown in FIG. 18. It may be seen from FIG. 17 (*a*) to FIG. 17 (*k*) and FIG. 18 that, when the shaft core rotates by 0° to 40° relative to the shaft sleeve, the intensity of the interference between the shaft core and the shaft sleeve gradually increases, and the friction torque also gradually increases from 0 kgf.cm to 6 kgf.cm. When the shaft core rotates by 40° to 140° relative to the shaft sleeve, the intensity of the interference between the shaft core and the shaft sleeve remains unchanged, and the friction torque remains to be 6 kgf.cm. When the shaft core rotates by 140° to 180° relative to the shaft sleeve, the intensity of the interference between the shaft core and the shaft sleeve gradually decreases, and the friction torque gradually decreases from 6 kgf.cm to 0 kgf.cm. It may be learned that the shaft core and the shaft sleeve that are in the damping rotating shaft in this embodiment of this application can achieve a damping effect when the first support plate rotates by 40° to 140° relative to the second support plate, friction torque generated when the damping effect is achieved is 6 kgf.cm, and a value of the friction torque may be adjusted by changing the radius of the changeable-diameter arc section.

In the embodiment shown in FIG. 13, to increase elasticity of the shaft sleeve 1041 to reduce abrasion generated between the shaft core 1042 and the shaft sleeve 1041 when the shaft core 1042 rotates, optionally, as shown in FIG. 13 or FIG. 14, an elastic notch 1043 is opened on a side wall of the shaft sleeve 1041. As shown in FIG. 14, the elastic notch 1043 communicates with a shaft hole in the shaft sleeve 1041, and the elastic notch 1043 extends through two end surfaces of the shaft sleeve 1041. In this way, elasticity of the shaft sleeve 1041 can be improved by using the elastic notch 1043. This reduces abrasion between the shaft core 1042 and the shaft sleeve 1041.

In the embodiment shown in FIG. 13, to implement relative securing between the shaft sleeve 1041 and the first support plate or the second support plate, optionally, as shown in FIG. 13, a first connecting plate 1044 is further included, the shaft sleeve 1041 is secured to an edge of one end of the first connecting plate 1044, and the first connecting plate 1044 is connected to the first support plate or the second support plate by using mucilage glue and a rivet. Therefore, relative securing between the shaft sleeve 1041 and the first support plate or the second support plate is implemented. Reliability of a connection formed by using the mucilage glue and the rivet is relatively high.

In the embodiment shown in FIG. 13, to implement relative securing between the shaft core 1042 and the second support plate or the first support plate, optionally, as shown in FIG. 13, a second connecting plate 1045 is further included, a connecting shaft sleeve 1046 is secured to an edge of one end of the second connecting plate 1045, one end of the shaft core 1042 extends and is securely sleeved in the connecting shaft sleeve 1046, and the second connecting plate 1045 is connected to the second support plate or the first support plate by using mucilage glue and a rivet. Therefore, relative securing between the shaft core 1042 and the second support plate or the first support plate is implemented. Reliability of a connection formed by using the mucilage glue and the rivet is relatively high.

Figure 23:
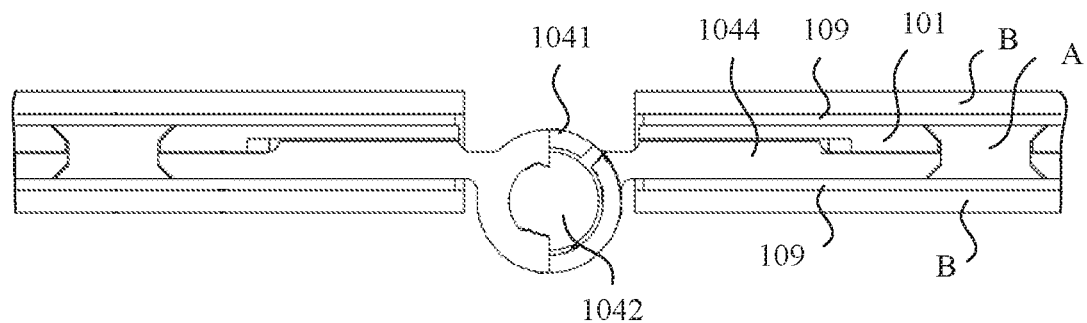
FIG. 23 is a schematic structural diagram of a first connecting plate, a first support plate, a rivet, a decorative sheet, and a soft material layer that are in a protective case for a tablet computer according to an embodiment of this application.

After the connecting plates (including the first connecting plate and the second connecting plate) are riveted to the support plates (including the first support plate and the second support plate) by using a rivet A, roughness or a gap inevitably appears on outer surfaces of the connecting plates and the support plates. Therefore, if the outer surfaces are directly covered with a soft material layer B such as leather or cloth, moulage easily appears to affect good appearance. To avoid the problem, optionally, as shown in FIG. 23, a decorative sheet 109 is stuck to the outer surfaces after the connecting plates are riveted to the support plates, and the decorative sheet 109 can cover a rough position and a gap position, so as to avoid the moulage generated after the outer surfaces are covered with the soft material layer B such as leather or cloth.

In the embodiment shown in FIG. 9, the following three optional embodiments may be used to ensure stability of a connection between the first support plate 101 and the second support plate 102.

In a first optional embodiment, one damping rotating shaft is connected between the first support plate and the second support plate, and the damping rotating shaft extends, to one end, from the other end of an edge on which the first support plate is connected to the second support plate. In this way, a stable connection between the first support plate and the second support plate is implemented by using a relatively long damping rotating shaft. However, because the damping rotating shaft is relatively long, a shaft core in the damping rotating shaft is also relatively long. Coaxiality of the thin and long shaft core is hard to ensure during machining, and the thin and long shaft core is easily deformed. Therefore, machining difficulty of the shaft core is relatively high, and assembling difficulty of the damping rotating shaft is relatively high.

In a second optional embodiment, there are a plurality of damping rotating shafts, the plurality of damping rotating shafts are evenly disposed on an edge of one end at which the first support plate is connected to the second support plate, and rotation axes of the plurality of damping rotating shafts are collinear. In this way, stability of a connection between the first support plate and the second support plate is ensured by using the plurality of damping rotating shafts, the damping rotating shaft may be manufactured with a relatively small length, and coaxiality of the shaft cores in the damping rotating shafts during machining is easily ensured. Therefore, machining difficulty of the shaft cores is relatively low, and assembling difficulty of the damping rotating shafts is relatively low.

In a third optional embodiment, as shown in FIG. 19, there are two damping rotating shafts 104, the two damping rotating shafts 104 are symmetrically disposed at two ends of an edge on which the first support plate is connected to the second support plate, and rotation axes of the two damping rotating shafts 104 are collinear. In this way, stability of a connection between the first support plate and the second support plate is ensured by using the two damping rotating shafts 104, the damping rotating shaft 104 may be manufactured with a relatively small length, and coaxiality of the shaft cores 1042 in the damping rotating shafts 104 during machining is easily ensured. Therefore, machining difficulty of the shaft cores 1042 is relatively low, and assembling difficulty of the damping rotating shafts 104 is relatively low.

In the second or third optional embodiment, to block a gap between the first support plate 101 and the second support plate 102 to ensure good appearance of the protective case 100, optionally, as shown in FIG. 19, a blocking shaft 107 is disposed between the two adjacent damping rotating shafts 104, the blocking shaft 107 is configured to block the gap between the first support plate 101 and the second support plate 102, and two ends of the blocking shaft 107 are connected to the shaft cores 1042 in the two adjacent damping rotating shafts 104. In this way, the gap between the first support plate 101 and the second support plate 102 is blocked by using the blocking shaft 107. This ensures good appearance of the protective case 100.

The blocking shaft 107 may be securely or rotatably connected to the shaft cores 1042. This is not specifically limited herein.

To implement a rotatable connection between the blocking shaft 107 and the shaft cores 1042 in the two adjacent damping rotating shafts 104, optionally, connection holes (not shown in the figure) are opened on end surfaces of the two ends of the blocking shaft 107, and one end that is of each of the shaft cores 1042 in the two adjacent damping rotating shafts 104 and that is close to the blocking shaft 107 extends outwards and fits into the connection hole. In this way, the rotatable connection between the blocking shaft 107 and the shaft cores 1042 is implemented. In the connection manner, during operation, the shaft cores 1042 need to be sleeved only in the connection holes without a complex connection operation. Therefore, an installation process and a detachment process are simple, and efficiency is relatively high.

In the foregoing embodiment, a process of assembling the two adjacent damping rotating shafts and the blocking shaft may be shown in FIG. 20 (a) to FIG. 20 (d). Referring to FIG. 20 (a) to FIG. 20 (d), the shaft cores 1042 in the two damping rotating shafts are first separately rotatably sleeved in the shaft sleeve 1041 secured to the first connecting plate 1044 in the two damping rotating shafts, and two ends of the shaft core 1042 extend out of two ends of the shaft sleeve 1041 (as shown in FIG. 20 (a)), and then the connecting shaft sleeve 1046 on the second connecting plate 1045 in the two damping rotating shafts is separately securely sleeved on one end of the two shaft cores 1042 that extends out of the shaft sleeve 1041 (as shown in FIG. 20 (b)). An assembled structure is shown in FIG. 20 (c). Finally, the blocking shaft 107 is connected to the other end of the two shaft cores 1042 that extends out of the shaft sleeve 1041 (as shown in FIG. 20 (d)). An assembled structure is shown in FIG. 21.

Figures 22A, 22B, 22C, 22D:
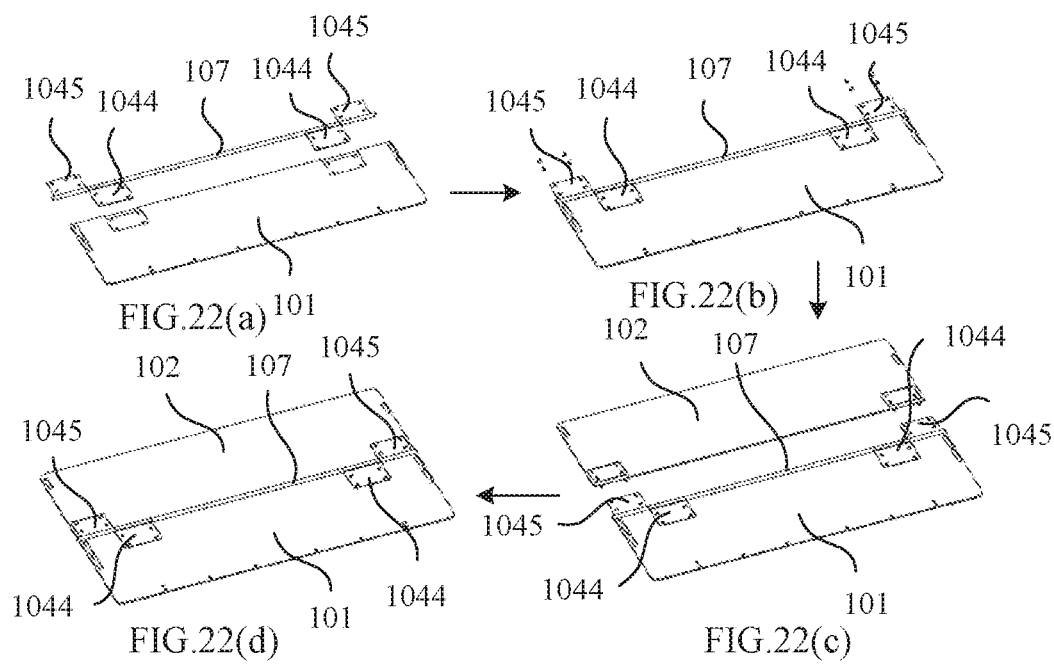
FIG. 22 (a) is a schematic structural diagram of a first support plate and a component that is obtained after the damping rotating shaft and the blocking shaft that are shown in FIG. 21 are assembled.

Further, a process of assembling the first support plate 101, the second support plate 102, and a component (shown in FIG. 21) that is formed after assembling of the two damping rotating shafts 104 and the blocking shaft 107 is finished may be shown in FIG. 22 (a) to FIG. 22 (d). Referring to FIG. 22 (a) to FIG. 22 (d), the first connecting plate 1044 in the two damping rotating shafts is first connected to the first support plate 101 by using mucilage glue and a rivet (as shown in FIG. 22 (a)). A connected structure is shown in FIG. 22 (b). Then the second connecting plate 1045 in the two damping rotating shafts is connected to the second support plate 102 by using mucilage glue and a rivet (as shown in FIG. 20 (c)). An assembled structure is shown in FIG. 22 (d).

Figure 24:
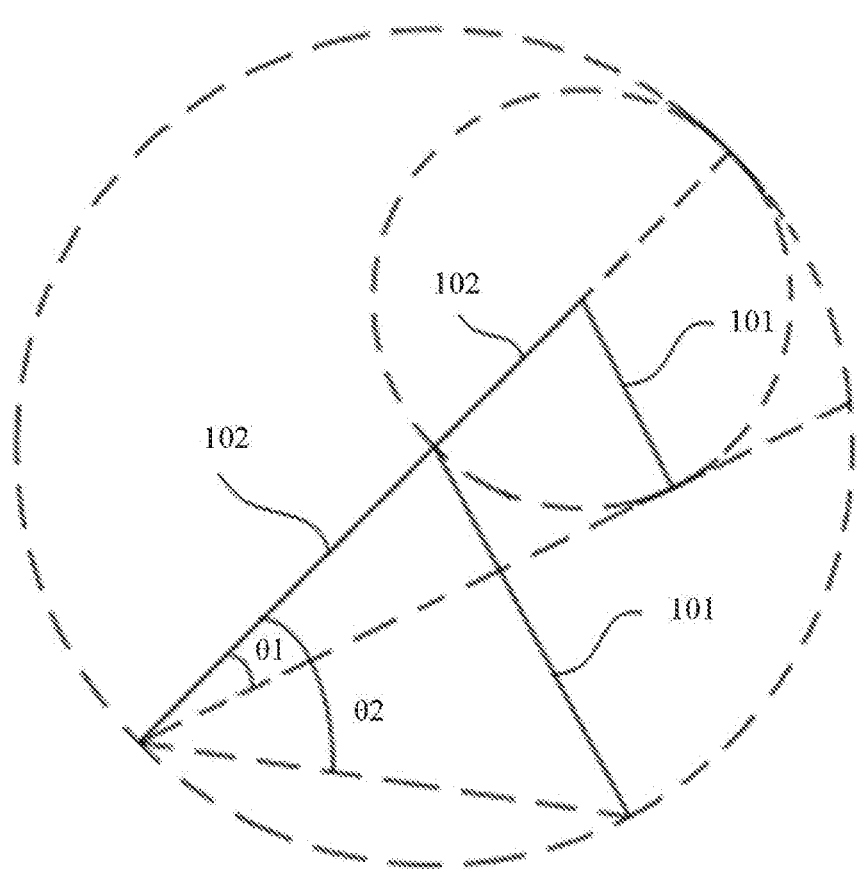
FIG. 24 is a diagram of a comparison between a support angle θ1 of an A-frame when a width of a first support plate is less than a width of a second support plate and a support angle θ2 of the A-frame when the width of the first support plate is equal to the width of the second support plate, when the first support plate in a protective case for a tablet computer rotates by a same angle as the second support plate according to an embodiment of this application.
Figure 25:
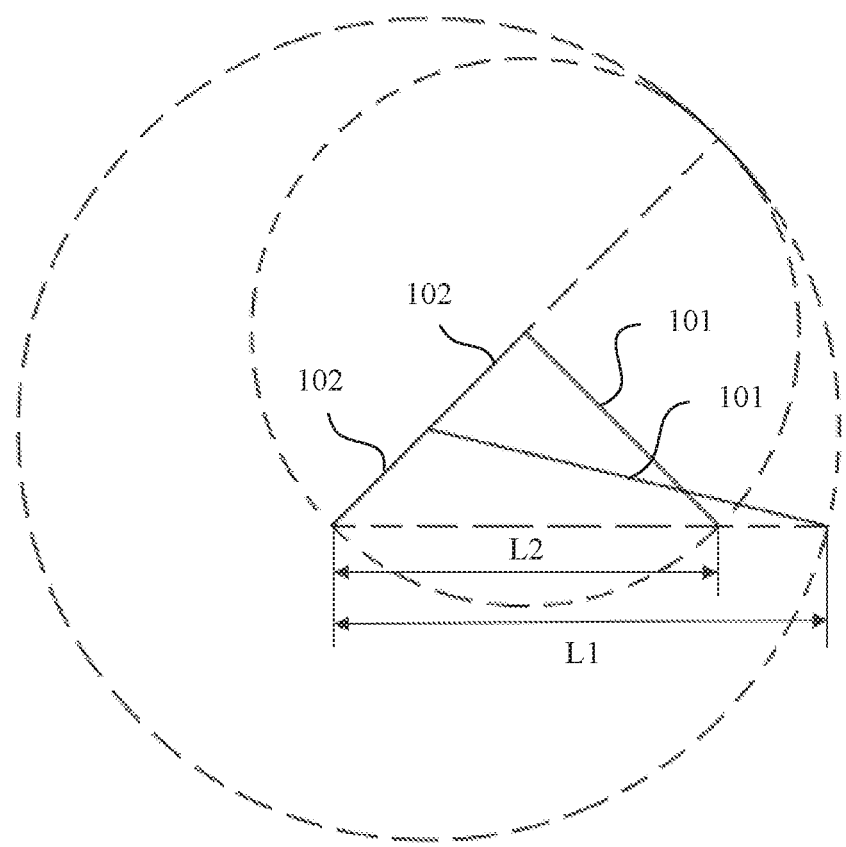
FIG. 25 is a diagram of a comparison between a floor length L1 of an A-frame when a width of a first support plate is greater than a width of a second support plate and a floor length L2 of the A-frame when the width of the first support plate is equal to the width of the second support plate, when the first support plate in a protective case for a tablet computer rotates relative to the second support plate to form a same support angle θ according to an embodiment of this application.

In the embodiment shown in FIG. 9, a width of the first support plate 101 may be greater than, less than, or equal to a width of the second support plate 102 in the first direction N. This is not specifically limited herein. When the first support plate 101 rotates by a same angle as the second support plate 102, as shown in FIG. 24, a support angle θ1 of the A-frame when the width of the first support plate 101 is less than the width of the second support plate 102 is less than a support angle θ2 of the A-frame when the width of the first support plate 101 is equal to the width of the second support plate 102. Therefore, when the width of the first support plate 101 is equal to the width of the second support plate 102, the support angle has a larger adjustment range. However, when the first support plate 101 rotates relative to the second support plate 102 to form a same support angle θ, as shown in FIG. 25, a floor length L1 of the A-frame when the width of the first support plate 101 is greater than the width of the second support plate 102 is greater than a floor length L2 of the A-frame when the width of the first support plate 101 is equal to the width of the second support plate 102. Based on the foregoing descriptions, to enable the A-frame formed by the first support plate 101 and the second support plate 102 to have a relatively large adjustment range of the support angle, and to narrow down a floor area obtained after the first support plate 101 and the second support plate 102 form the A-frame, optionally, the width of the first support plate 101 is equal to the width of the second support plate 102 in the first direction N. In this way, the A-frame formed by the first support plate 101 and the second support plate 102 can have a relatively large adjustment range of the support angle, and the floor area obtained after the first support plate 101 and the second support plate 102 form the A-frame can also be narrowed down.

Figure 26:
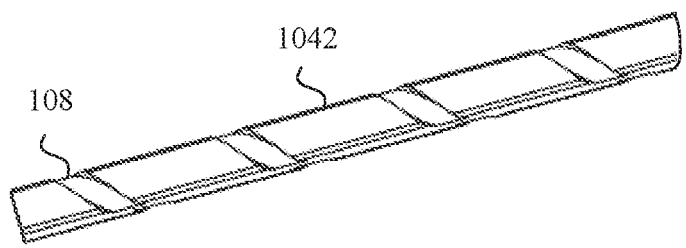
FIG. 26 is a schematic structural diagram of a shaft core and a lube oil groove on the shaft core in a protective case for a tablet computer according to an embodiment of this application.

In the embodiment shown in FIG. 13, when the shaft core 1042 rotates in the shaft sleeve 1041, a scrap is inevitably generated. To expel the scrap, and to effectively lubricate a contact position between the shaft core 1042 and the shaft sleeve 1041, optionally, as shown in FIG. 26, a helical lube oil groove 108 is opened around a side wall of the shaft core 1042, and the lube oil groove 108 extends from one end of the shaft core 1042 to the other end of the shaft core 1042. When the helical lube oil groove 108 plays a role of oil storage and lubrication, the scrap generated due to friction between the shaft core 1042 and the shaft sleeve can be expelled along the lube oil groove 108, so as to avoid a lubrication failure caused by blocking the lube oil groove 108 by the scrap, so that a life of the damping rotating shaft is prolonged.

To reduce abrasion between the shaft core and the shaft sleeve to prolong the life of the damping rotating shaft, optionally, both the shaft core and the shaft sleeve are made of high-carbon steel. The high-carbon steel has relatively high hardness and relatively desirable abrasion resistance. This can prolong the life of the damping rotating shaft. Specifically, the shaft core and the shaft sleeve may be made of an SUS420 steel material.

When the shaft core is machined by using a conventional mechanical machining method, a design length of the shaft core cannot be increased because coaxiality of the shaft core is usually hard to ensure. Consequently, a friction contact area between the shaft core and the shaft sleeve cannot be increased, and effective damping force cannot be provided. To avoid the foregoing problem, optionally, the shaft core is machined and molded by a computer numerical control machine (Computer numerical control, CNC) machining center. The computer numerical control machine machining center has relatively high molding precision. This can ensure coaxiality of the shaft core. Therefore, the design length of the shaft core may be properly increased. When the friction contact area between the shaft core and the shaft sleeve is fixed, a design diameter of the shaft core may be reduced while the design length of the shaft core is increased, so that a fine and thin damping rotating shaft may be manufactured.

Similarly, optionally, the shaft sleeve is integrally molded through metal injection molding (Metal injection Molding, MIM). The metal injection molding has relatively high molding precision that can reach 0.01 mm. This can ensure coaxiality of all parts of the shaft sleeve in a length direction. Therefore, a design length of the shaft sleeve may be properly increased. When the friction contact area between the shaft core and the shaft sleeve is fixed, a design diameter of the shaft sleeve may be reduced while the design length of the shaft sleeve is increased, so that a fine and thin damping rotating shaft may be manufactured. Moreover, because radiuses of parts of the inner wall of the shaft sleeve are inconsistent, when the odd-form shaft sleeve is machined by using the conventional mechanical machining method, machining difficulty is relatively high and a plurality of machining processes are usually needed. However, when a part is molded through metal injection molding, a molding process is simple and efficiency is relatively high. Moreover, the part is molded once without further machining. Therefore, a process of molding the shaft sleeve is simple and efficiency is relatively high.

In the foregoing embodiment, after the shaft sleeve is integrally molded through metal injection molding, to further improve abrasion resistance and hardness of the shaft sleeve, optionally, the shaft sleeve may be processed by using the following process. To be specific, after the shaft sleeve is molded, in a first step, a defect that is generated during molding and that is of the shaft sleeve is compensated for by using a shaping process. In a second step, toughness and abrasion resistance of the shaft sleeve are improved through heat treatment. In a third step, an elastic notch on the shaft sleeve is cut by using a linear cutting process. In a fourth step, an outer surface of the shaft sleeve is processed by using a polishing process to fill in a pore, a scratch, and another surface defect on the outer surface of the shaft sleeve, so as to improve fatigue resistance and corrosion resistance. In a fifth step, nickel plating is performed on a surface of the shaft sleeve, to further improve corrosion resistance of the shaft sleeve. In a sixth step, an external film is deposited on an outer surface of a nickel plating layer by using a physical vapor deposition technique, and the external film may be used to resist oxidation or identify a color of the shaft sleeve.

In the foregoing processing process, when the shaft sleeve is made of a 17-4PH alloy, a heat treatment process and a parameter of the shaft sleeve may be as follows: Solution treatment is first performed on the shaft sleeve, where a temperature during the solution treatment is 1050° C., and duration is five hours, to improve plasticity and toughness of the alloy; aging processing is then performed on the shaft sleeve, where a temperature during the aging processing is 450° C., and duration is eight hours, to improve hardness and strength of the shaft sleeve. The strength of the shaft sleeve obtained after solution treatment and aging processing are performed needs to reach 90 kgf/mm to 120 kgf/mm, the hardness needs to reach 380 HV to 420 HV, and straightness needs to be controlled within 0.04 mm. When the shaft sleeve is made of an SUS420 steel material, a heat treatment process and a parameter of the shaft sleeve may be as follows: The shaft sleeve is first heated to 960° C. by using a quenching treatment technology, and the temperature is kept for 40 minutes to 60 minutes, to reduce a possibility that the shaft sleeve deforms and cracks. Then the shaft sleeve is heated to 200° C. by using a tempering treatment technology, and the temperature is kept for four hours, to improve ductility and toughness of the shaft sleeve. Strength of the shaft sleeve obtained after quenching treatment and tempering treatment are performed needs to reach 90 kgf/mm to 120 kgf/mm, hardness needs to reach 480 HV to 530 HV, and straightness needs to be controlled within 0.04 mm.

It should be noted that the damping rotating shaft in any one of the foregoing technical solutions may not only be applied to the protective case for a tablet computer, but also be applied to a product, such as a mobile phone, a camera, or a table lamp. This is not specifically limited herein.

It should be noted that the protective case in any one of the foregoing technical solutions may not only be configured to protect the tablet computer, but also be configured to protect a device, such as a mobile phone or a learning machine. This is not specifically limited herein.

As shown in FIG. 10 to FIG. 12, this application provides a two-in-one computer, including a tablet computer 200, a keyboard 106, and a protective case 100. The protective case 100 is the protective case 100 for a tablet computer in any one of the foregoing technical solutions, a rear surface of the tablet computer 200 are supported on a first support plate 101 and a second support plate 102 of the protective case 100, a side wall of the tablet computer 200 is detachably connected to a bottom support 105 of the protective case 100, and the keyboard 106 is installed on a cover plate 103 of the protective case 100.

For the two-in-one computer provided in this embodiment of this application, the cover plate 103 of the protective case 100 is flipped to cover a front surface of the tablet computer 200, so as to effectively protect the front surface and the rear surface of the tablet computer 200. When the tablet computer 200 switches to a notebook computer mode, the cover plate 103 may be placed on a horizontal desktop, the second support plate 102 is flipped upwards by a first angle relative to the cover plate 103, the first support plate 101 is flipped downwards by a second angle relative to the second support plate 102, and an edge of an end that is of the first support plate 101 and that is far away from the second support plate 102 comes into contact with the horizontal desktop, so as to form an A-frame to support the rear surface of the tablet computer 200. In addition, the bottom support 105 supports a lower end of the tablet computer 200. Compared with the prior art, in this application, in the notebook computer mode, the bottom support 105 is connected to the rear surface of the tablet computer 200, and the rear surface of the tablet computer 200 is supported by using the A-frame. Compared with a prior-art solution in which only the lower end of the tablet computer 200 is supported, this application has higher stability. To switch to a tablet computer mode, the tablet computer 200 only needs to be taken out of the protective case 100. Compared with the prior art, in this application, in the tablet computer mode, use portability and a degree of experience of lightness and thinness of the tablet computer 200 is relatively desirable. Moreover, in this application, the tablet computer 200 is supported by using the protective case 100. Therefore, no support needs to be additionally disposed on the rear surface of the tablet computer 200, and external cleanness and uniformity in the tablet computer mode are relatively high.

Figure 27:
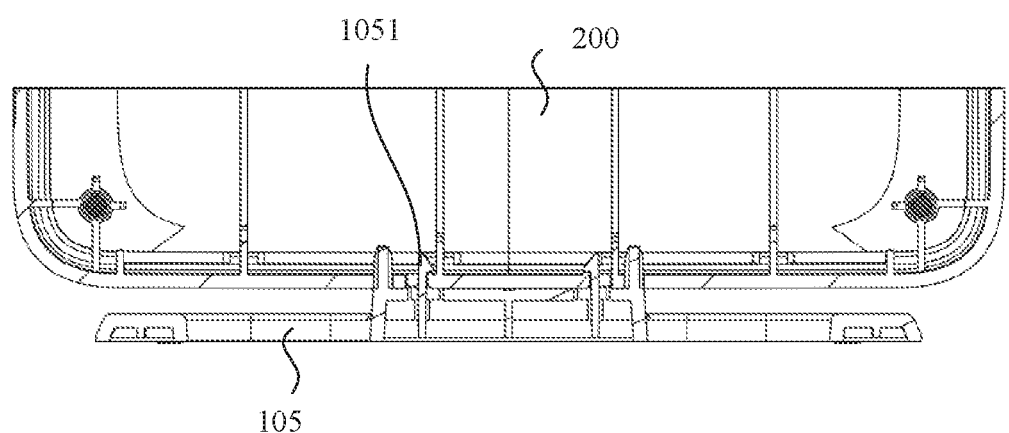
FIG. 27 is a schematic diagram of a connection structure between a tablet computer and a bottom support that are in a two-in-one computer according to an embodiment of this application.

In the foregoing embodiment, there may be a plurality of optional implementation solutions to implement a detachable connection between the bottom support 105 and the tablet computer 200. For example, as shown in FIG. 27, a clamping hook 1051 is disposed on the bottom support 105, a groove (not shown in the figure) is provided at a position that is on the tablet computer 200 and that corresponds to the clamping hook, and the clamping hook 1051 is cooperatively hooked to the groove. This implements the detachable connection between the bottom support 105 and the tablet computer 200. The structure is simple, and detachment and installation operations are convenient. For another example, a threaded via hole is disposed on the bottom support, a tapped hole is disposed on a position that is on the tablet computer and that corresponds to the threaded via hole, and a screw passes through the threaded via hole and is cooperatively connected in the tapped hole. Therefore, the detachable connection between the bottom support and the tablet computer is implemented. The structure is simple, and connection stability is relatively desirable. For still another example, as shown in FIG. 12, the side wall of the tablet computer 200 is made of a magnetic material, a magnet (not shown in the figure) is secured in the bottom support 105, and the side wall of the tablet computer 200 is attracted to the bottom support 105. In this way, only the magnetic material needs to be selected as a material of the side wall of the tablet computer 200, without a need to dispose a connection structure on the side wall of the tablet computer 200. Therefore, required structural space is small, facilitating reduction in a volume of the tablet computer 200. In addition, the connection structure does not need to be disposed on the side wall of the tablet computer 200. This ensures external cleanness of the tablet computer 200

In the descriptions of this specification, the specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A protective case for a tablet computer, comprising:
   a first support plate;
   a second support plate, wherein the first support plate is hinged to the second support plate using a damping rotating shaft comprising a shaft sleeve and a shaft core, wherein an elastic notch is opened on a side wall of the shaft sleeve, wherein the elastic notch communicates with a shaft hole in the shaft sleeve, and wherein the elastic notch extends through two end surfaces of the shaft sleeve; and
   a cover plate, wherein the first support plate, the second support plate, and the cover plate are located in a same horizontal plane and are sequentially arranged in a first direction,
   wherein the second support plate is rotatably connected to the cover plate,
   wherein a bottom support is disposed on an edge of one end that is proximate to the cover plate and that is on an upper surface of the second support plate,
   wherein the first support plate and the second support plate are configured to support and protect a rear surface of the tablet computer,
   wherein the bottom support is configured to be detachably connected to a side wall of the tablet computer,
   wherein the cover plate is configured to mount a keyboard on the cover plate,
   wherein the cover plate is configured to protect a front surface of the tablet computer after rotating and overlapping the first support plate and the second support plate,
   wherein one of the shaft sleeve or the shaft core is secured to the first support plate, wherein the other one of the shaft sleeve or the shaft core is secured to the second support plate, wherein the shaft sleeve is made of an elastic material, wherein a base circle arc section and two changeable-diameter arc section are formed around an inner wall of the shaft sleeve, wherein the two changeable-diameter arc sections are symmetrically disposed using a central axis of the shaft sleeve as a symmetry axis, wherein two flat positions are formed on the outer circular surface of the shaft core, wherein the two flat positions are in a one-to-one correspondence with the two changeable-diameter arc sections, wherein the shaft core is cooperatively sleeved in the base circle arc section, wherein a radius of the changeable-diameter arc section is less than a radius of the base circle arc section, and wherein a flat position is formed at a position that is on an outer circular surface of the shaft core and that fits the changeable-diameter arc sections.

2. The protective case for the tablet computer of claim 1, wherein a width of the first support plate is equal to a width of the second support plate in the first direction.

3. The protective case for the tablet computer of claim 1, wherein a helical lube oil groove is opened around a side wall of the shaft core, and wherein the helical lube oil groove extends from one end of the shaft core to the other end of the shaft core.

4. The protective case for the tablet computer of claim 1, wherein both the shaft core and the shaft sleeve are made of high-carbon steel.

5. The protective case for the tablet computer of claim 1, wherein the shaft core is machined and molded by a computer numerical control machining center.

6. The protective case for the tablet computer of claim 1, wherein the shaft sleeve is integrally molded through metal injection molding.

7. A two-in-one computer, comprising:
a tablet computer;
a keyboard; and
a protective case comprising:
  a first support plate;
  a second support plate, wherein the first support plate is hinged to the second support plate using a damping rotating shaft comprising a shaft sleeve and a shaft core, wherein an elastic notch is opened on a side wall of the shaft sleeve, wherein the elastic notch communicates with a shaft hole in the shaft sleeve, and wherein the elastic notch extends through two end; and
  a cover plate,
  wherein the first support plate, the second support plate, and the cover plate are located in a same horizontal plane and are sequentially arranged in a first direction, wherein the second support plate is rotatably connected to the cover plate,
  wherein a bottom support is disposed on an edge of one end that is proximate to the cover plate and that is on an upper surface of the second support plate,
  wherein the cover plate is configured to protect a front surface of the tablet computer after rotating and overlapping the first support plate and the second support plate,
  wherein a rear surface of the tablet computer is supported on the first support plate and the second support plate of the protective case,
  wherein a side wall of the tablet computer is detachably connected to the bottom support of the protective case,
  wherein the keyboard is installed on the cover plate of the protective case,
  wherein one of the shaft sleeve or the shaft core is secured to the first support plate, wherein the other one of the shaft sleeve or the shaft core is secured to the second support plate, wherein the shaft sleeve is made of an elastic material, wherein a base circle arc section and two changeable-diameter arc section are formed around an inner wall of the shaft sleeve, wherein the two changeable-diameter arc sections are symmetrically disposed using a central axis of the shaft sleeve as a symmetry axis, wherein two flat positions are formed on the outer circular surface of the shaft core, wherein the two flat positions are in a one-to-one correspondence with the two changeable-diameter arc sections, wherein the shaft core is cooperatively sleeved in the base circle arc section, wherein a radius of the changeable-diameter arc section is less than a radius of the base circle arc section, and wherein a flat position is formed at a position that is on an outer circular surface of the shaft core and that fits the changeable-diameter arc sections.

8. The two-in-one computer of claim 7, wherein the side wall of the tablet computer is made of a magnetic material, wherein a magnet is secured in the bottom support, and wherein the side wall of the tablet computer is configured to be magnetically coupled to the bottom support.

9. The protective case for the tablet computer of claim 6, wherein the shaft sleeve is further processed through heat treatment.

10. The protective case for the tablet computer of claim 9, wherein the shaft sleeve is made of a 17-4PH alloy, and wherein the heat treatment of the shaft comprises:
  performing a solution treatment on the shaft sleeve, wherein a temperature during the solution treatment is about 1050 degrees Celsius (° C.), and wherein a duration of the solution treatment is about five hours; and
  performing aging processing on the shaft sleeve, wherein a temperature during the aging processing is about 450° C., and wherein a duration of the aging processing is about eight hours.

11. The protective case for the tablet computer of claim 9, wherein the shaft sleeve is made of an SUS420 steel material, and wherein the heat treatment of the shaft comprises:
  heating the shaft sleeve to a first temperature using a quenching treatment technology;
  keeping the first temperature for about 40 minutes to about 60 minutes;
  heating the shaft sleeve to a second temperature using tempering treatment technology; and
  keeping the second temperature for about four hours, wherein the first temperature is about 960 degrees Celsius (° C.), and wherein the second temperature is about 200° C.

12. The two-in-one computer of claim 7, wherein the protective case comprises either a 17-4PH alloy or an SUS420 steel material.

13. The two-in-one computer of claim 7, wherein the shaft sleeve is processed through heat treatment.

14. The two-in-one computer of claim 13, wherein the shaft sleeve is made of a 17-4PH alloy, and wherein the heat treatment of the shaft comprises:
  performing a solution treatment on the shaft sleeve, wherein a temperature during the solution treatment is about 1050 degrees Celsius (° C.), and wherein a duration of the solution treatment is about five hours; and
  performing aging processing on the shaft sleeve, wherein a temperature during the aging processing is about 450° C., and wherein a duration of the aging processing is about eight hours.

15. The two-in-one computer of claim 13, wherein the shaft sleeve is made of an SUS420 steel material, and wherein the heat treatment of the shaft comprises:
  heating the shaft sleeve to a first temperature using a quenching treatment technology;
  keeping the first temperature for about 40 minutes to about 60 minutes;
  heating the shaft sleeve to a second temperature using tempering treatment technology; and
  keeping the second temperature for about four hours, wherein the first temperature is about 960 degrees Celsius (° C.), and wherein the second temperature is about 200° C.

16. The two-in-one computer of claim 2, wherein a width of the first support plate is equal to a width of the second support plate in the first direction.

17. The two-in-one computer of claim 2, wherein a helical lube oil groove is opened around a side wall of the shaft core, and wherein the helical lube oil groove extends from one end of the shaft core to the other end of the shaft core.

18. The two-in-one computer of claim 2, wherein both the shaft core and the shaft sleeve are made of high-carbon steel.

19. The two-in-one computer of claim 2, wherein the shaft core is machined and molded by a computer numerical control machining center.

20. The two-in-one computer of claim 2, wherein the shaft sleeve is integrally molded through metal injection molding.

* * * * *

UNITED STATES PATENT AND TRADEMARK OFFICE
CERTIFICATE OF CORRECTION

PATENT NO. : 10,871,016 B2  
APPLICATION NO. : 16/478363  
DATED : December 22, 2020  
INVENTOR(S) : Xiaodong Zhai et al.

Page 1 of 1

It is certified that error appears in the above-identified patent and that said Letters Patent is hereby corrected as shown below:

In the Claims

Claim 16, Column 22, Line 56: "claim 2" should read "claim 7"

Claim 17, Column 22, Line 59: "claim 2" should read "claim 7"

Claim 18, Column 22, Line 63: "claim 2" should read "claim 7"

Claim 19, Column 22, Line 65: "claim 2" should read "claim 7"

Claim 20, Column 23, Line 1: "claim 2" should read "claim 7"

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*